(12) United States Patent
Nishi et al.

(10) Patent No.: US 6,434,737 B1
(45) Date of Patent: Aug. 13, 2002

(54) METHOD AND APPARATUS FOR PROGRAMMING BY USE OF EVENT-DRIVEN-TYPE FUNCTION BLOCKS AND PROGRAM RECORDING MEDIUM STORING A PROGRAM FOR EXECUTING THE METHOD

(75) Inventors: Yosuke Nishi, Kamakura; Hirotsugu Tsunematsu, Yokohama; Takashi Mishima, Yamato, all of (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/361,169

(22) Filed: Jul. 27, 1999

(30) Foreign Application Priority Data

Jul. 27, 1998 (JP) .......................................... 10-210639

(51) Int. Cl.[7] ................................................ G06F 9/44
(52) U.S. Cl. ........................... 717/105; 709/318; 700/18
(58) Field of Search ............................... 717/105, 100, 717/103–104, 106–119, 162–167; 345/763, 965–970; 702/112, 119–123; 709/318, 328; 700/17–20, 53, 169, 181, 253, 2, 4, 83; 341/741; 710/36; 716/18

(56) References Cited

U.S. PATENT DOCUMENTS

| | | | | |
|---|---|---|---|---|
| 5,404,319 A | * | 4/1995 | Smith et al. ................... | 716/18 |
| 5,590,266 A | * | 12/1996 | Carson et al. .............. | 345/741 |
| 5,768,119 A | * | 6/1998 | Havekost et al. ............... | 700/4 |
| 5,801,942 A | * | 9/1998 | Nixon et al. ................... | 700/83 |
| 5,909,368 A | * | 6/1999 | Nixon et al. ................... | 700/2 |
| 5,938,745 A | * | 8/1999 | Boyle .......................... | 710/36 |
| 5,970,430 A | * | 10/1999 | Burns et al. ................. | 702/122 |

OTHER PUBLICATIONS

International Electrotechnical Commission, Technical Comittee No. 65: Industrial–Process Measurement and Control, Working Group 6, Committee Draft—Function Blocks for Industrial–Process Measurement and Control Systems, Part 1—Architecture, May 2, 1999, pp. 1–41.
IEC 61499 FAQ (5pp.).

* cited by examiner

*Primary Examiner*—Gregory Morse
*Assistant Examiner*—Hoang-Vu Anthony Nguyen-Ba

(57) ABSTRACT

A method for programming an application function through connection of a plurality of event-driven-type function blocks each composed of a data processing block and an event processing block. The method comprises a first processing step and a second processing step. When a first data signal line is set in order to establish a connection between first and second event-driven-type function blocks, the first processing step is performed in order to set a first variable area corresponding to the established connection and adapted for data transfer. In the second processing step, a pointer for pointing to the first variable area is allocated to each of the first and second event-driven-type function blocks so that the first and second event-driven-type function blocks output data to and input data from the first variable area.

17 Claims, 22 Drawing Sheets

METHOD AND APPARATUS FOR PROGRAMMING BY USE OF EVENT-DRIVEN-TYPE FUNCTION BLOCKS AND PROGRAM RECORDING MEDIUM STORING A PROGRAM FOR EXECUTING THE METHOD

BACKGROUND OF THE INVENTION

1. Field of the Invention

The present invention generally relates to a method for programming an application function by use of event-driven-type function blocks, and more particularly to a method for programming an application function by use of event-driven-type function blocks wherein a plurality of event-driven-type function blocks each composed of a data processing block and an event processing block are connected in order to generate an application function and wherein merging of signal lines is enabled for efficient programming of the application function. The present invention further relates to a program recording medium in which a program for executing the method is stored.

2. Description of the Related Art

A programming technique using a diagrammatic representation called an "event-driven-type function block" has become popular. The event-driven-type function block is composed of a function block portion for governing a data flow and a timing block portion for controlling the timing of the data flow. The timing of the data flow—control of which has been difficult for a conventional programming method in which an application function is generated through mere connection of functions blocks—is adjusted by means of timing blocks which are represented in the same manner as are function blocks and are connected properly.

In the case where an application function is generated through establishment of connections between event-driven-type function blocks, there must be developed a technique that enables efficient programming of an application function through realization of a user interface that can be used easily.

Specifications in relation to representation of an application function by use of event-driven-type function blocks are defined as IEC1499 but have not been finalized.

An event-driven-type function block according to the IEC1499 standard has a basic structure as shown in FIG. 19. In response to transmission of an event, an algorithm corresponding to a present status is started. The algorithm performs predetermined processing, while using input variables of a data input. Subsequently, the algorithm sets resultant values as output variables of a data output, and outputs an event indicating completion of the processing. In some cases, internal variables are prepared separately from the input/output variables, and the algorithm performs predetermined processing while using the internal variables.

When an application function is created by use of event-driven-type function blocks as shown in FIG. 19, connections are established between the event sections of the event-driven-type function blocks as well as between the data sections of the event-driven-type function blocks, as shown in FIG. 20.

The application function shown in FIG. 20 performs the following processing in response to an event input from EIN. When a value input from IN at that time is greater than a constant value of 100, correction operation 1 is performed, and a resultant value is input to a subsequent block as data to be post-processed. When the value is less than a constant value of 0, correction operation 2 is performed, and a resultant value is input to the subsequent block as data to be post-processed. When the value is between 0 and 100, correction operation 3 is performed, and a resultant value is input to the subsequent block as data to be post-processed.

The specifications of the event-driven-type function block shown in FIG. 19 have been under study, and a definition has been provided for presence of a group of input variables and a group of output variables. However, the manner for preparing these variable groups has not been defined. In the case where the conventional event-driven-type function blocks shown in FIGS. 19 and 20 are used, there is presumably employed a structure as shown in FIG. 21, in which a variable area is prepared for each of input and output terminals of each event-driven-type function block. In an exemplary case where two event-driven-type function blocks FB1 and FB2 are connected via variable areas as shown in FIG. 21, when transfer of an event occurs in an execution stage, data in an output variable area provided for the output terminal of FB1 is copied to an input variable area provided for the input terminal of FB2. Thus, an application function is realized.

However, studies performed by the present inventors revealed that the technique shown in FIG. 21 causes the following problems. That is, although a direction connection can be established between the event-driven-type function blocks when data are supplied to two or more branches, a direction connection cannot be established between the event-driven-type function blocks when data from two or more lines are merged into a single line. In the latter case, an event-driven-type function block having a selection function must be used.

Specifically, in an exemplary case shown in FIG. 22 where output data from an event-driven-type function block FB1 are input to two event-driven-type function blocks FB2 and FB3, data in the output variable area of the event-driven-type function block FB1 are copied to an input variable area of the event-driven-type function block FB2 and are also copied to an input variable area of the event-driven-type function block FB3. In the above case where data are supplied to branches, the event-driven-type function blocks can be connected with one another through direct connections, because a source-destination relationship can be determined univocally for the data-copying operation.

By contrast, in an exemplary case shown in FIG. 23 where output data from two event-driven-type function blocks FB1 and FB2 are input to a single event-driven-type function block FB3, it cannot be determined whether data in the output variable area of the event-driven-type function block FB1 or data in the output variable area of the event-driven-type function block FB2 are to be copied to an input variable area of the event-driven-type function block FB3. In the above case where data are merged, the event-driven-type function blocks cannot be connected with one another through direct connections, because a source-destination relationship cannot be determined univocally for the data-copying operation.

Moreover, when the technique shown in FIG. 21 is used, an event-driven-type function block having a selection function must be employed in order to select a data set to be transmitted to a subsequent stage. In the example shown in FIG. 20, an event-driven-type function block SEL having a selection function is employed for selecting one of the resultant values of the correction operations 1–3 for transmission to a subsequent stage.

However, when the technique shown in FIG. 21 is used, a user who programs an application function encounters a difficulty in programming, because event-driven-type function blocks cannot be connected for data merging. In the exemplary case shown in FIG. 23, an event-driven-type function block having a selection function must be used even in a simple operation of inputting into the function block FB3 the newer one of a data set output from the function block FB1 and a data set output from the function block FB2. Therefore, programming becomes difficult and time consuming.

SUMMARY OF THE INVENTION

An object of the present invention is to provide a method for programming an application function through connection of a plurality of event-driven-type function blocks in which merging of signal lines is enabled for efficient programming of the application function.

Another object of the present invention is to provide a program recording medium in which is stored a program for executing a method for programming an application function through connection of a plurality of event-driven-type function blocks in which merging of signal lines is enabled for efficient programming of the application function.

Still another object of the present invention is to provide an apparatus for programming an application function through connection of a plurality of event-driven-type function blocks in which merging of signal lines is enabled for efficient programming of the application function.

Further object of the present invention is to provide a program recording medium in which is stored a program obtained through execution of a method for programming an application function through connection of a plurality of event-driven-type function blocks in which merging of signal lines is enabled for efficient programming of the application function.

The present invention provides a method for programming an application function through connection of a plurality of event-driven-type function blocks each composed of a data processing block and an event processing block. The method comprises at least a first processing step and a second processing step. When a first data signal line is set in order to establish a connection between first and second event-driven-type function blocks, in the first processing step, a first variable area for data transfer is set for the established connection. In the second processing step, a pointer for pointing to the first variable area is allocated to each of the first and second event-driven-type function blocks so that the first and second event-driven-type function blocks output data to and input data from the first variable area.

The present invention also provides a program recording medium in which is stored a program for executing a method for programming an application function through connection of a plurality of event-driven-type function blocks each composed of a data processing block and an event processing block, wherein the program recording medium stores a program for causing a computer to perform a setting process and an allocation process. When a first data signal line is set in order to establish a connection between first and second event-driven-type function blocks, the setting process sets a first variable area corresponding to the established connection and adapted for data transfer. The allocation process allocates a pointer for pointing to the first variable area to each of the first and second event-driven-type function blocks so that the first and second event-driven-type function blocks output data to and input data from the first variable area.

The present invention further provides an apparatus for programming an application function through connection of a plurality of event-driven-type function blocks each composed of a data processing block and an event processing block, the apparatus comprising a setting section and an allocation section. When a first data signal line is set in order to establish a connection between first and second event-driven-type function blocks, the setting section sets a first variable area for data transfer for the established connection. The allocation section allocates a pointer for pointing to the first variable area to each of the first and second event-driven-type function blocks so that the first and second event-driven-type function blocks output data to and input data from the first variable area.

The present invention further provides a computer-readable recording medium in which is stored an application function programmed through connection of a plurality of event-driven-type function blocks each composed of a data processing block and an event processing block, wherein the application function performs data transfer between first and second event-driven-type function blocks by use of a first variable area provided for a first signal line set between the first and second event-driven-type function blocks, data transfer between a third event-driven-type function block and the first data signal line mutually connecting the first and second event-driven-type function blocks by use of a second variable area provided for a second signal line set between the third event-driven-type function block and the first data signal line mutually connecting the first and second event-driven-type function blocks, and data transfer between the first data signal line mutually connecting the first and second event-driven-type function blocks and a fourth data signal line mutually connecting fourth and fifth event-driven-type function blocks by use of a third variable area provided for the fourth data signal line set between the first signal line mutually connecting the first and second event-driven-type function blocks and the third signal line mutually connecting the fourth and fifth event-driven-type function blocks.

DESCRIPTION OF THE PREFERRED EMBODIMENTS

Figure 1:
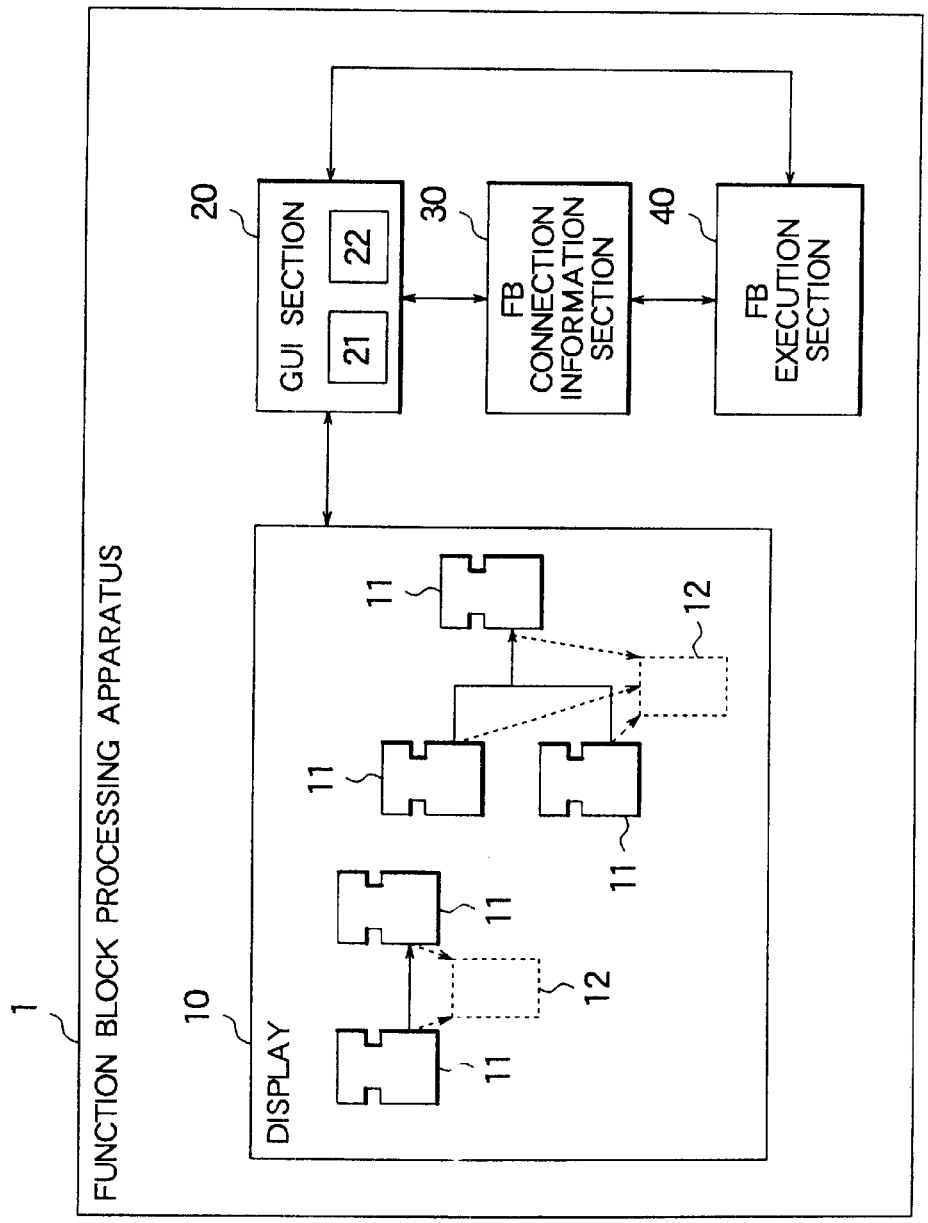
FIG. 1 is a structural diagram showing the principle of the present invention.

FIG. 1 is a structural diagram showing the principle of the present invention. In FIG. 1, reference numeral 1 denotes a function block processing apparatus of the present invention which generates an application function through establishment of connections between a plurality of event-driven-type function blocks each composed of a data processing block and an event processing block, and which executes the application function.

The function block processing apparatus 1 of the present invention comprises a display 10, a GUI section 20, an FB connection information section 30, and an FB execution section 40.

The display 10 displays schematic FIGS. 11 representing event-driven function blocks so as to display an application function created by the GUI section 20. Through interactions with a user, the GUI section 20 creates an application function defined by connections established between the function blocks. The FB connection information section 30 stores information with regard to the application function created by the GUI section 20 (information as to the types of event-driven function blocks and the manner of connection among them). The FB execution section 40 executes the application function by starting the event-driven function blocks in accordance with the information with regard to the application function stored in the FB connection information section 30.

The GUI section 20 comprises a setting section 21 and an allocation section 22 in order to implement the present invention. When a signal line is set in order to establish a connection between event-driven function blocks, for the thus-set connection, the setting section 21 sets a variable area 12 for data transfer. In addition, for each of the event-driven function blocks, the allocation section 22 allocates a pointer which points to the variable area 12 so that each of the function blocks input data from or output data to the variable area 12.

The function of the function block processing apparatus 1 according to the present invention is implemented in the form of a program. The program is stored in a floppy disk or any other removable disk or a hard disk in a server, from which the program is installed to the function block apparatus 1 so as to operate on the memory.

In the function block processing apparatus 1 of the present invention as described above, when a signal line is set between data processing blocks of event-driven function blocks, for the thus-set connection, the setting section 21 of the GUI section 20 sets the variable area 12 (which may be of an FIFO type) for transferring data between the data processing blocks. Specifically, a variable area 12 for data transfer is set through generation of a new variable area 12 or through allocation of an existing variable area 12.

After the setting section 21 sets the variable area 12, the allocation section 22 of the GUI section 20 allocates a pointer which points to the thus-set variable area 12 so that each of the data processing blocks associated with the variable area 12 inputs data from or outputs data to the variable area 12.

Figure 2A:
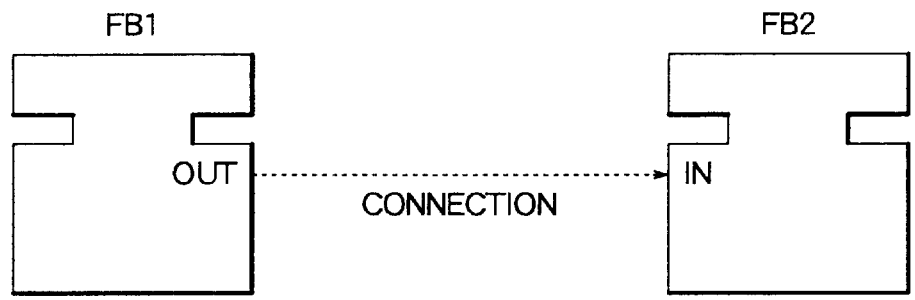
FIGS. 2 and 3 are diagrams used for describing the present invention.
Figure 2B:
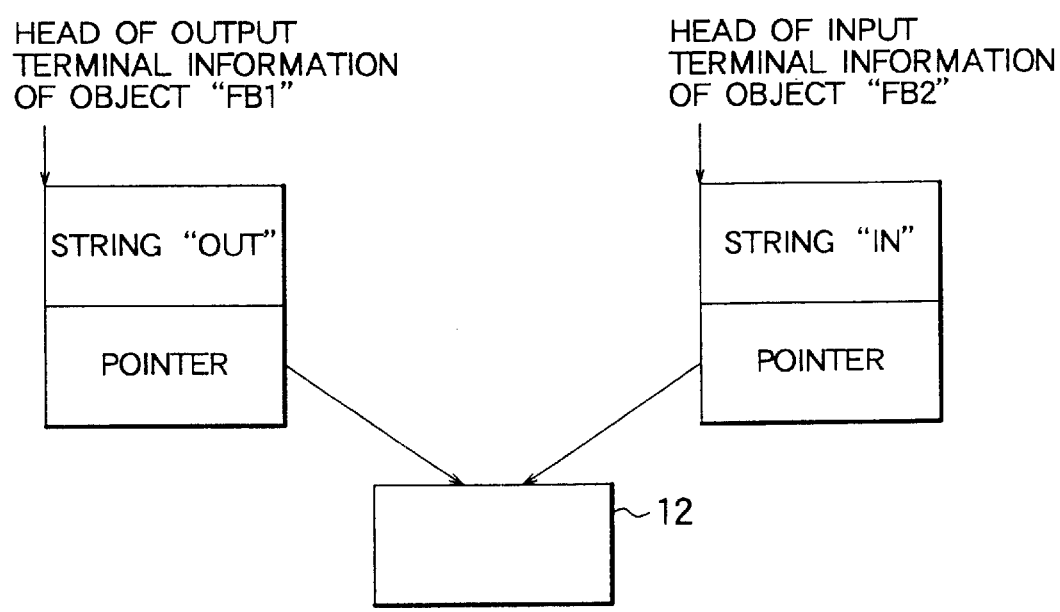

For example, as shown in FIG. 2(a), when a connection is established between an output terminal of the data processing block of an event-driven function block FB1 and an input terminal of the data processing block of an event-driven function block FB2 on the display 10, a variable area 12 for data transfer between FB1 and FB2 is set. Then, as shown in FIG. 2(b), a pointer pointing to the thus-set variable area 12 is defined in each of the output terminal information of the FB1 and the input terminal information of the FB2.

When a signal line is set between a data processing block and a signal line that mutually connects other data processing blocks, or between signal lines each mutually connecting a different pair of data processing blocks, the allocation section 22 of the GUI section 20 sets a variable area 12 (which may be of an FIFO type) for data transfer for the connection established in each case.

After the setting section 21 sets the variable area 12, the allocation section 22 of the GUI section 20 allocates a pointer which points to the thus-set variable area 12 so that each of the data processing blocks associated with the variable area 12 can input data from or output data to the variable area 12.

Figure 3A:
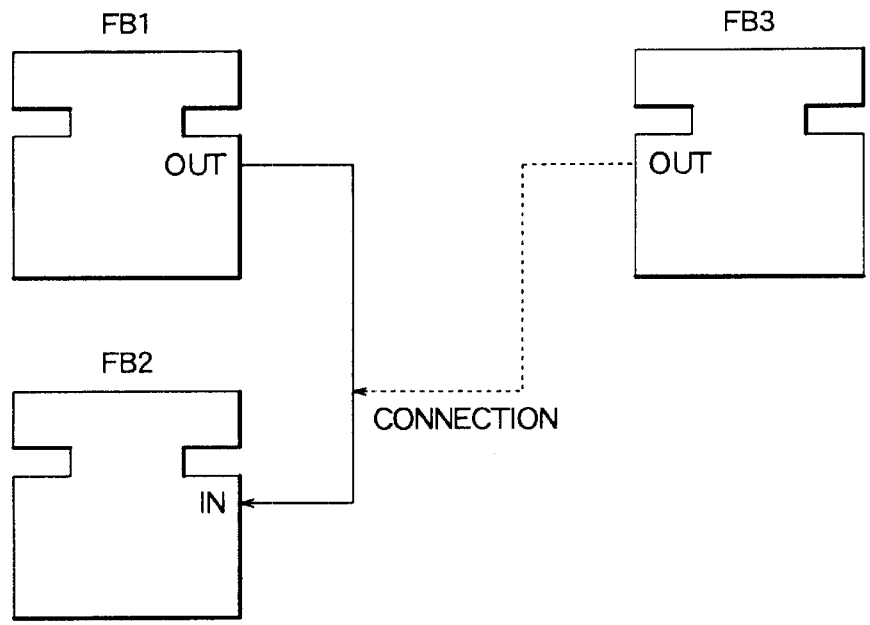
Figure 3B:
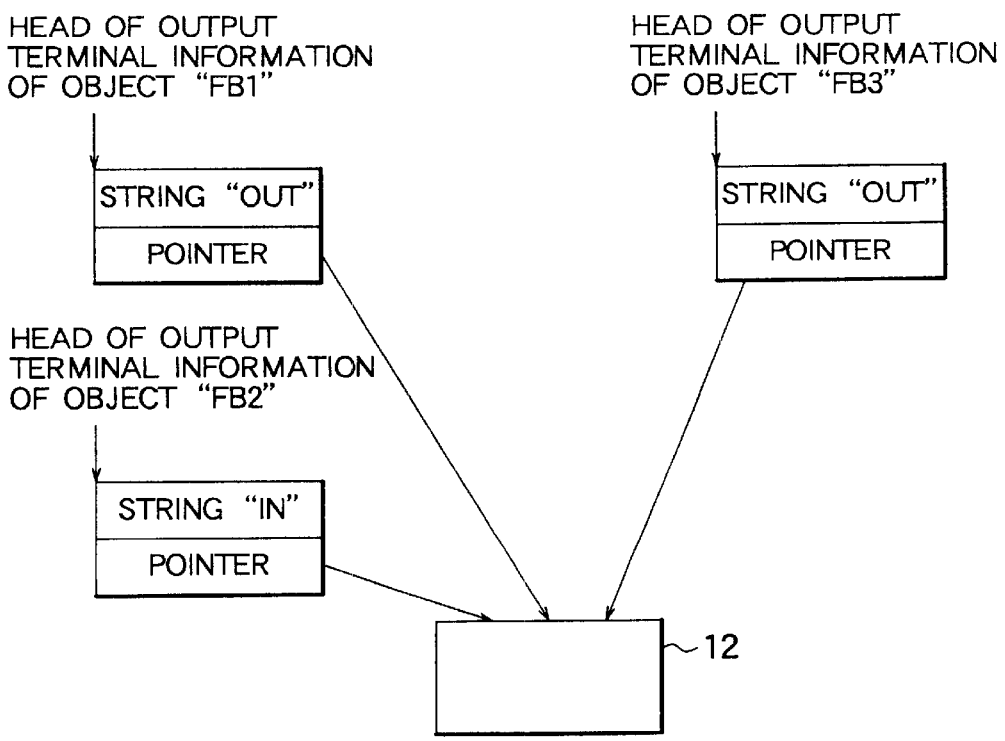

For example, as shown in FIG. 3(a), when a connection is established, on the display 10, between a signal line connecting an output terminal of the data processing block of an event-driven function block FB1 and an input terminal of the data processing block of an event-driven function block FB2, and an output terminal of the data processing block of an event-driven function block FB3, a variable area 12 for data transfer is set. Then, as shown in FIG. 3(b), a pointer pointing to the thus-set variable area 12 is defined in each of the output terminal information of the FB1, the input terminal information of the FB2, and the output terminal information of the FB3.

In this case, data output from the data-output-side event-driven function blocks are immediately written into the variable area 12. The data-input-side event-driven function block can read data as is from the variable area 12, when an event is transferred. Therefore, even when data are merged, no confusion arises in relation to data sources from which data are read, and thus a connection for data merging is realized.

As has been described, the present invention enables a connection for data merging to be established between event-driven function blocks. As a result, the application function which is defined by the connections of event-driven function blocks can be programmed with efficiency.

Additionally, since event-driven function blocks can be connected directly without use of an event-driven function block having a selection function, memory capacity can be reduced. Furthermore, the application function can be performed at high speed, because there is no need to copy data for data transfer between the event-driven function blocks during execution of the application.

The present invention will now be described in detail in accordance with an embodiment.

Figure 4:
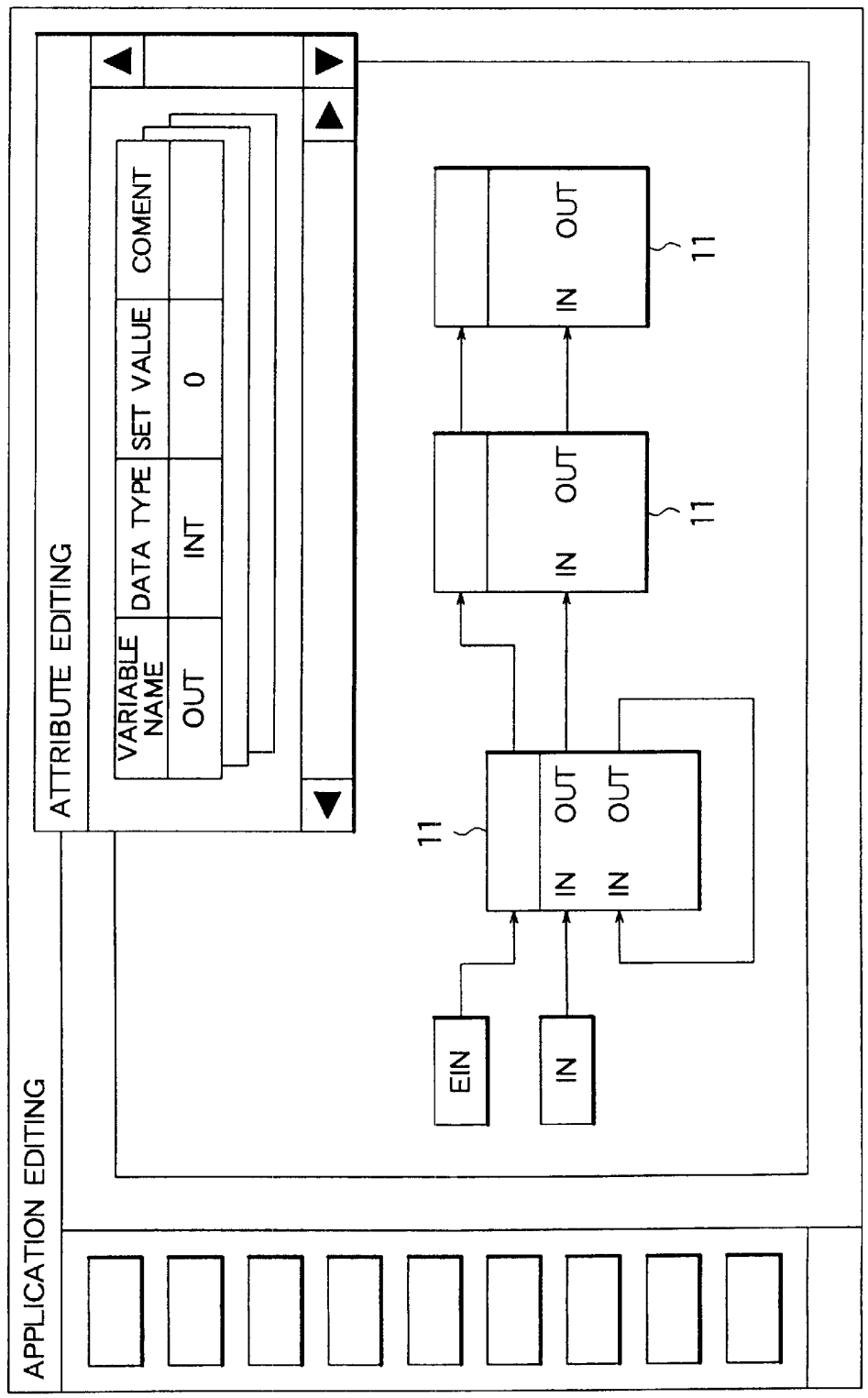
FIG. 4 is an explanatory view showing a display screen.

As shown in FIG. 4, the GUI section 20 of the function block processing apparatus 1 of the present invention creates an application function. That is, through interaction with a user, the GUI section 20 displays on a display screen schematic FIG. 11 of event-driven function blocks, and determines connections between the schematic FIG. 11 so as to create the application function.

More specifically, the processing for displaying schematic FIG. 11 is performed as follows. When a user selects a schematic FIG. 11 of an event-driven function block from a list of schematic FIG. 11, the thus-selected schematic FIG. 11 is displayed on the screen at the location the user designates by use of a mouse. At this time, when a request for setting attribute information is made for an event-driven function block represented by the displayed FIG. 11, a setting screen for setting attribute information is displayed as shown in FIG. 4. By the use of the setting screen, the user can set attribute information such as names of input/output terminals of an event-driven function block, default values of data, and types of data.

Figure 5:
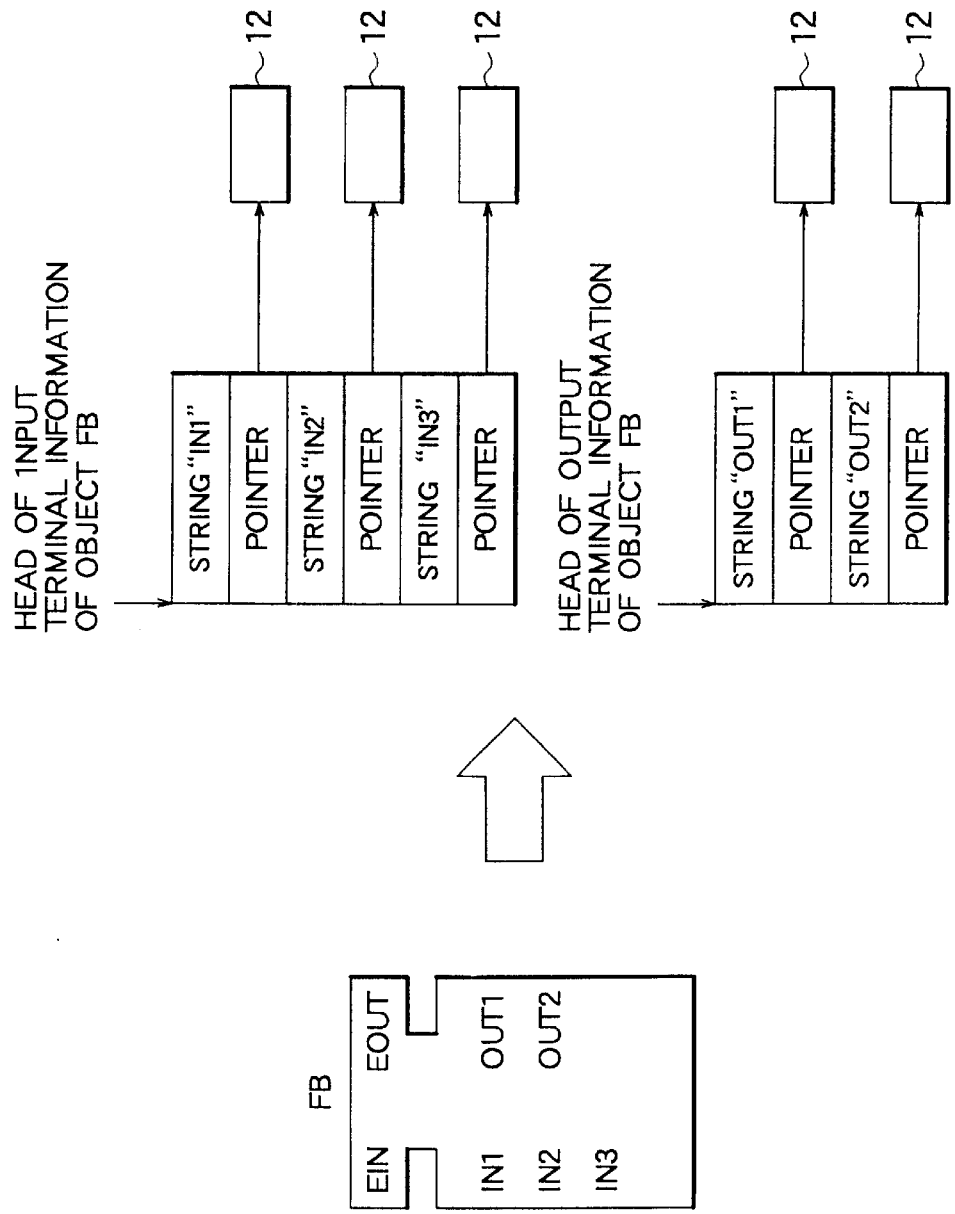
FIG. 5 is an explanatory view showing a variable area.

The event-driven function block having its schematic FIG. 11 displayed on the display screen is generated from the class of the function block in accordance with the class-instance relation. At this time, as shown in FIG. 5, a variable area 12 (a default value may be set as a variable) pointed to by a pointer is generated for each of data input/output terminals of the event-driven function block. As will become clear from the description below, the variable area 12 need not be generated at this moment, and is described as such only for the sake of convenience.

FIG. 6 through FIG. 9 are flowcharts showing the processing performed by the GUI section 20 according to a first embodiment. The present invention will be described in detail in accordance with the flowcharts.

Figure 6:
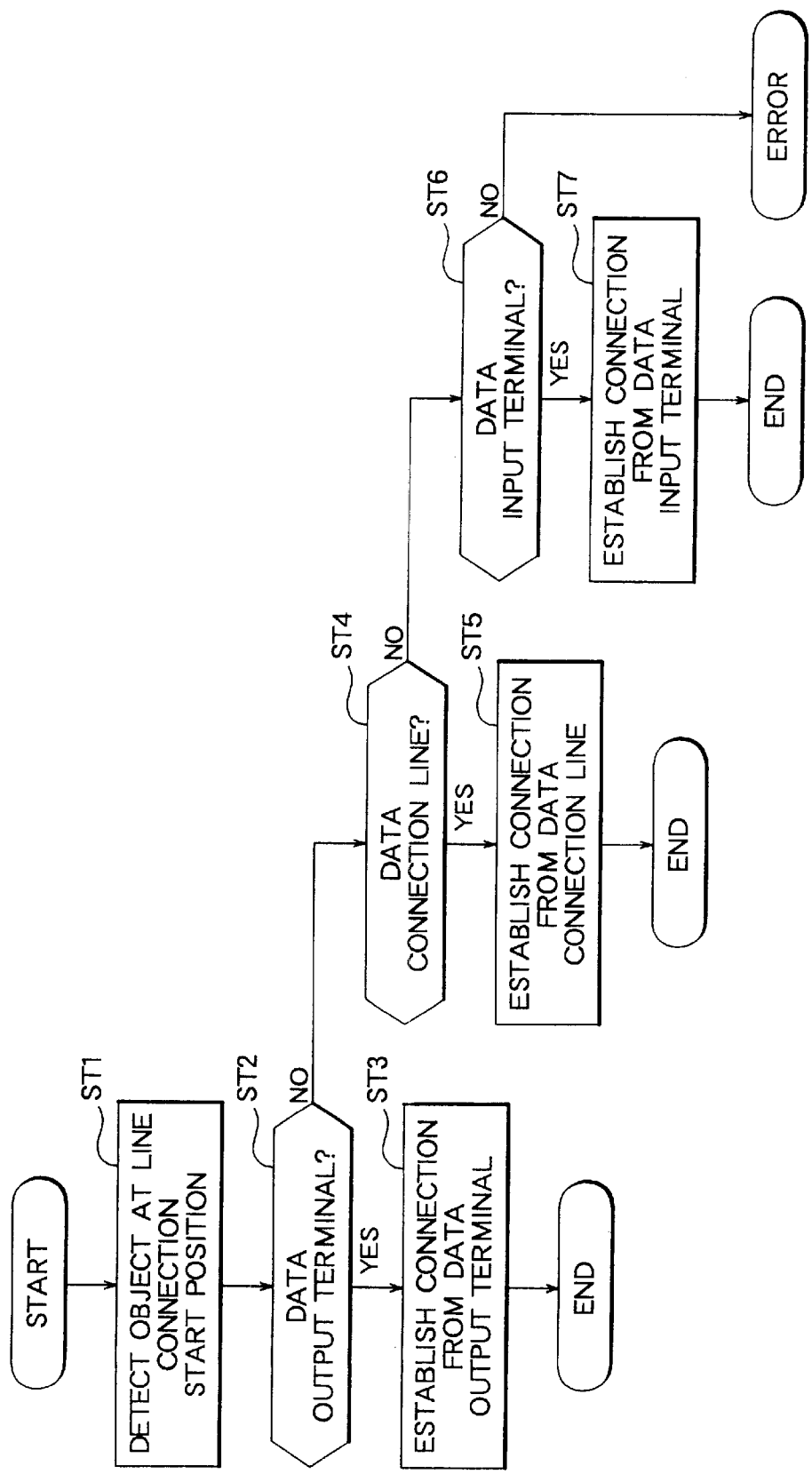
FIGS. 6–9 are flowcharts showing the processing performed by a GUI section according to a first embodiment.

The GUI section 20 first displays on the display screen schematic FIG. 11 of event-driven function blocks in accordance with designation by the user. When the user requests to establish a connection between schematic FIG. 11, the processing shown in FIG. 6 is started. In first step ST1, an object located at a line connection start position designated through use of a mouse is detected.

Then, in step ST2, a determination is made as to whether the object detected in step ST1 is a data output terminal. If the object is a data output terminal, the GUI section 20 proceeds to step ST3 so that a connection is established from the data output terminal in accordance with the processing of FIG. 7, which will be described later.

If it is determined in step ST2 that the object detected in step ST1 is not a data output terminal, the GUI section 20 proceeds to step ST4 in order to determine whether the object detected in step ST1 is a data connection line. If the object is a data connection line, the GUI section 20 proceeds to step ST5 so that a connection is established from the thus-detected data connection line in accordance with the processing of FIG. 8, as will be described hereinafter.

If it is determined in step ST4 that the object detected in step ST1 is not a data connection line, the GUI section 20 proceeds to step ST6 in order to determine whether the object detected in step ST1 is a data input terminal. If the object is a data input terminal, the GUI section 20 proceeds to step ST7 so that a connection is established from the thus-detected data input terminal in accordance with the processing of FIG. 9, which will be described later. If the object is not a data input terminal, the GUI section 20 determines that an error has occurred, thus terminating the processing.

Figure 7:
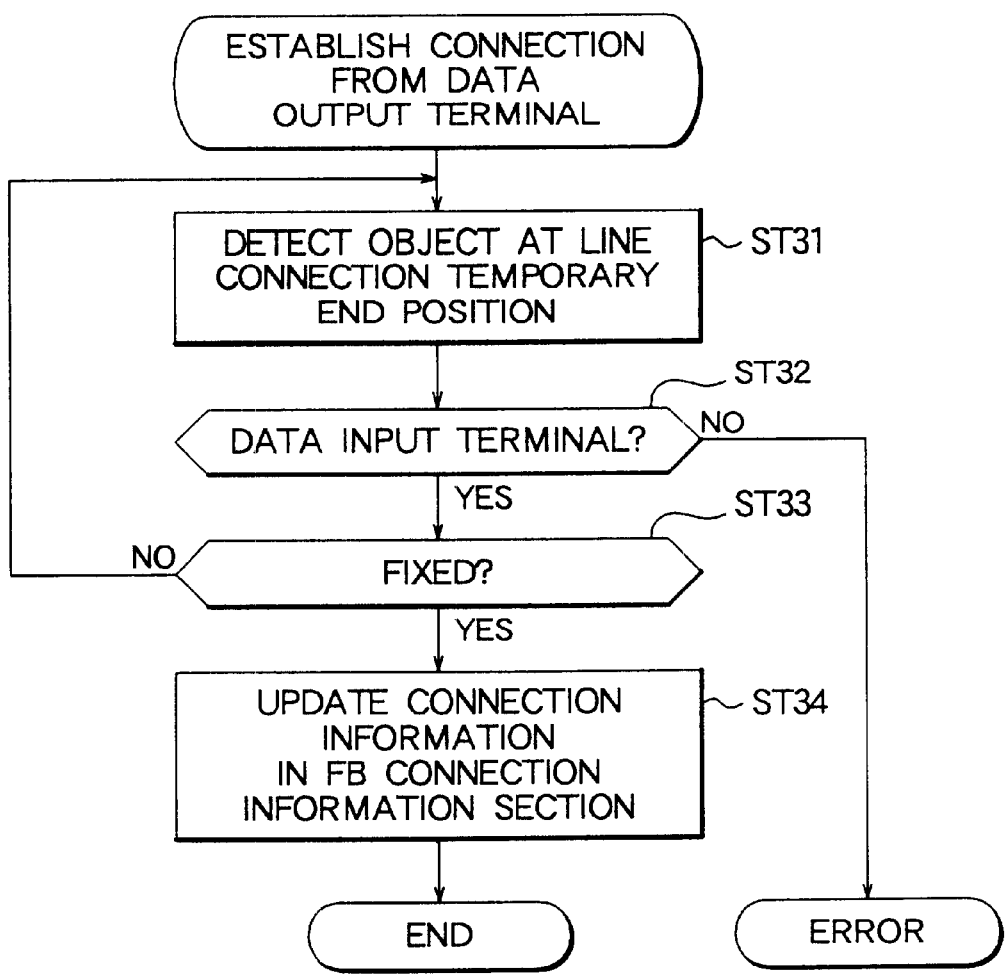

FIG. 7 shows the details of the processing for line connection from a data output terminal performed in step ST3 of the processing of FIG. 6. In step ST31, an object located at a line connection temporary end position designated through use of a mouse is detected.

Then, in step ST32, a determination is made as to whether the object detected in step ST31 is a data input terminal. If the object is not a data input terminal, the GUI section 20 determines that an error has occurred, thus terminating the processing. If the object is a data input terminal, the GUI section 20 proceeds to step ST33 in order to determine whether the data input terminal has been fixed as an object at the line connection end position. If the data input terminal is not fixed as such, the processing returns to step ST31.

When it is judged in step ST33 that the data input terminal detected in step ST31 has been fixed as an object at the line connection end position, the GUI section 20 proceeds to step ST34 so that a connection is established between the data output terminal detected in step ST1 of the processing of FIG. 6 and the data input terminal detected in step ST31. That is, a variable area 12 allocated to either of the data output terminal and the data input terminal is left valid. Then, the connection information managed by the FB connection information section 30 is updated such that the above-described pointers point to the valid variable area 12. A signal line is then displayed on the display screen such that the signal line extends between the schematic FIG. 11.

Figure 10A:
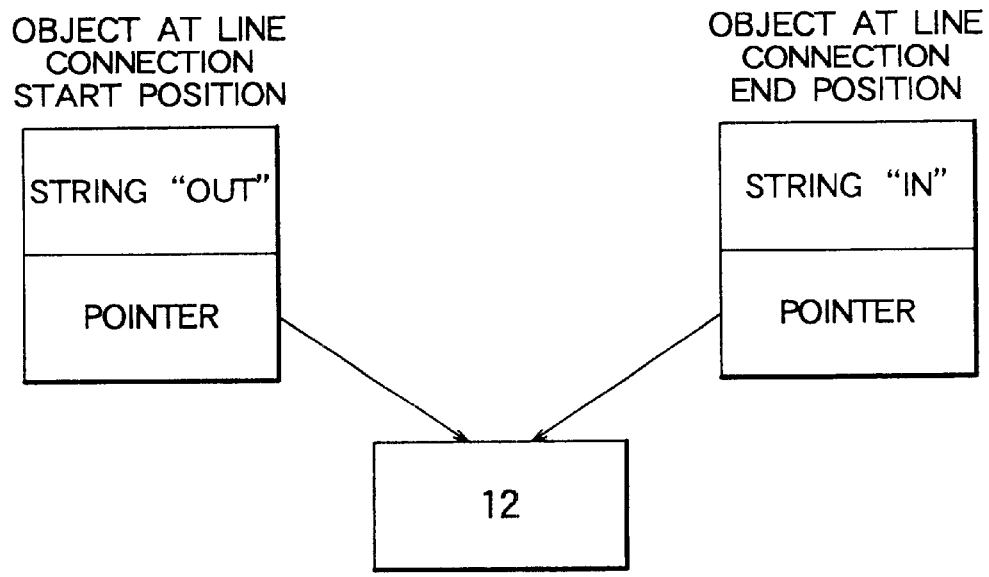
FIGS. 10–12 are diagrams used for describing the processing performed by the GUI section according to the first embodiment.
Figure 10B:
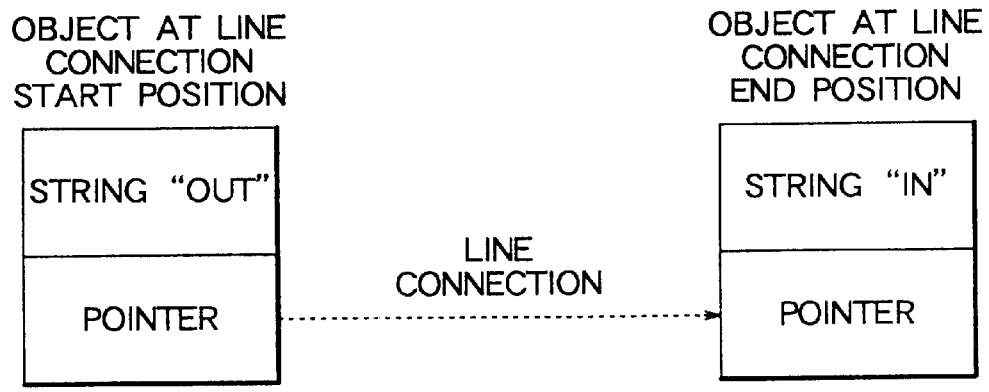

In this way, as shown in FIG. 10(a), the GUI section 20 defines a variable area 12 for the data output terminal at the line connection start position and the data input terminal at the line connection end position. Subsequently, setting is effected such that the data output terminal and the input terminal point to the thus-defined variable area 12. As a result, as shown in FIG. 10(b), a connection is established between the data output terminal at the line connection start position and the data input terminal at the line connection end position is established.

In addition, the variable area 12 may be generated dynamically as occasion demands.

Figure 8:
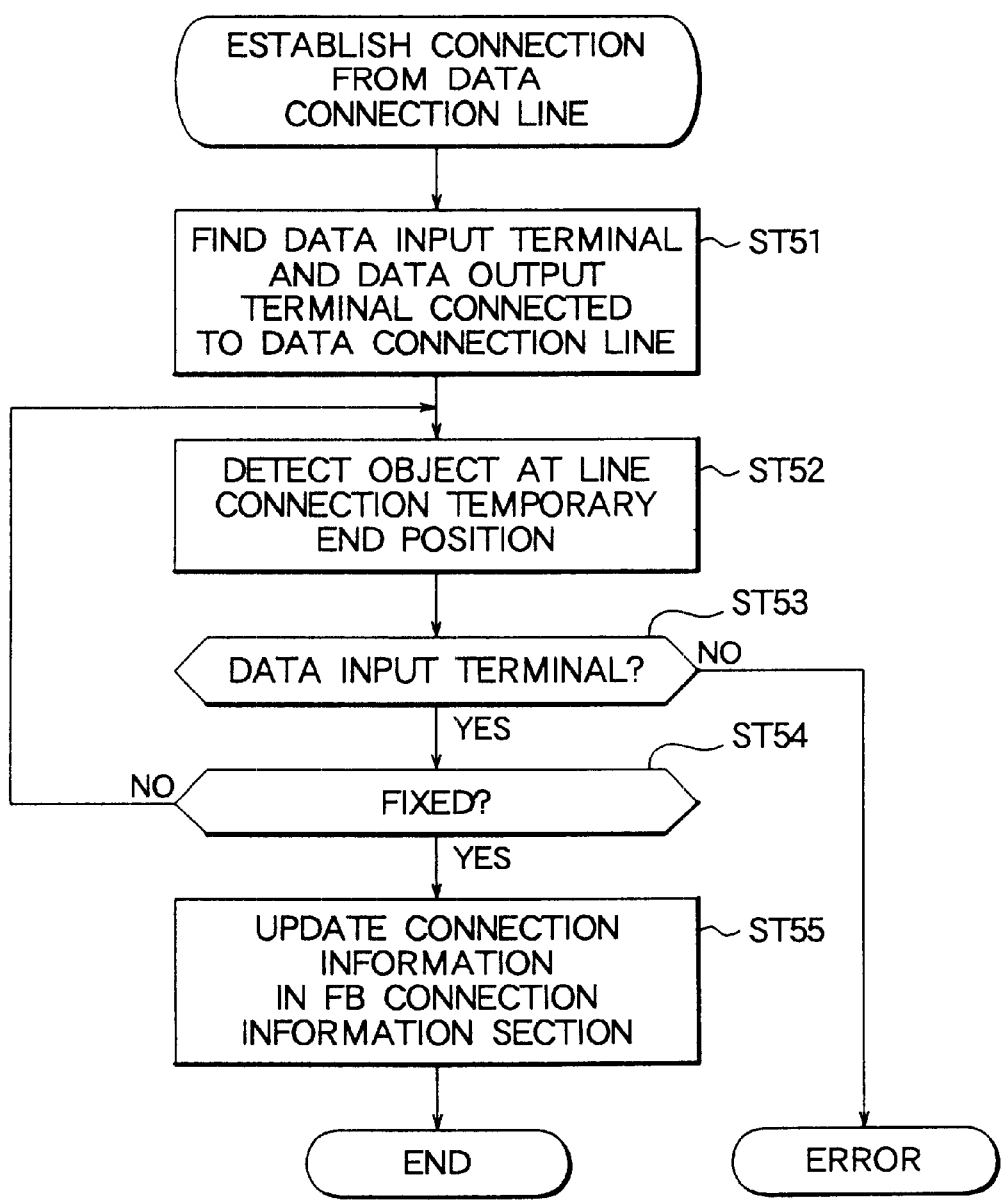

FIG. 8 shows the details of the processing for line connection from a data connection line performed in step ST5 of the processing of FIG. 6. In first step ST51, the GUI section 20 finds a data input terminal and a data output terminal connected to a data connection line that have been detected as an object at the line connection start position.

In step ST52, the GUI section 20 detects an object at a line connection temporary end position designated through use of a mouse. Then, in step ST53, a determination is made as to whether the object detected in step ST52 is a data input terminal. If the object is not a data input terminal, the GUI section 20 determines that an error has occurred, thus terminating the processing. If the object is a data input terminal, the GUI section 20 proceeds to step ST54 in order to determine whether the data input terminal has been fixed as an object at the line connection end position. If the data input terminal is not fixed as such, the processing returns to step ST52.

When it is judged in step ST54 that the data input terminal detected in step ST52 has been fixed as an object at the line connection end position, the GUI section 20 proceeds to step ST55 so that a connection is established between the data connection line detected in step ST1 of the processing of FIG. 6 and the data input terminal detected in step ST52. That is, a variable area 12 allocated to either of the data connection line or the data input terminal is left valid. Then, the connection information managed by the FB connection information section 30 is updated such that the above-described pointers point to the valid variable area 12. A signal line is then displayed on the display screen such that the signal line extends between the schematic FIGS. 11.

Figure 11A:
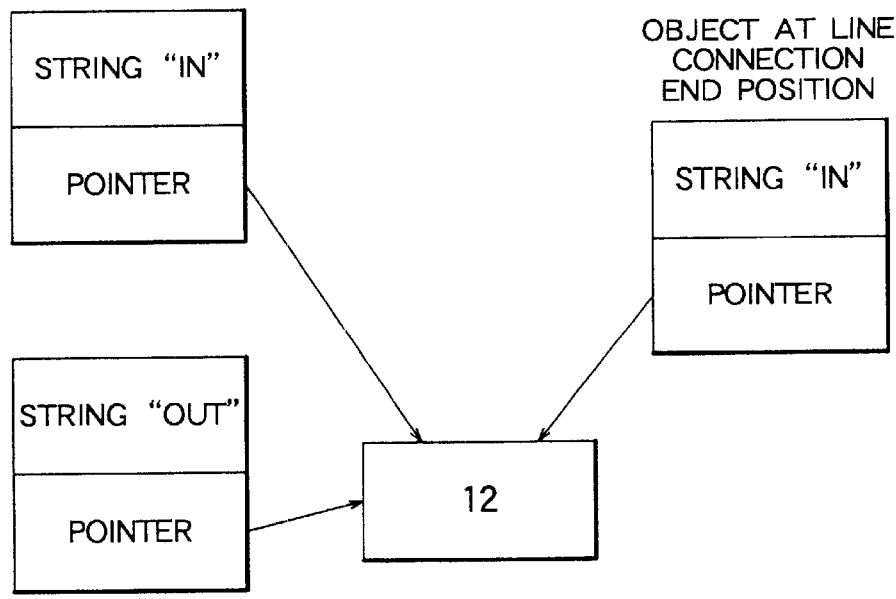
Figure 11B:
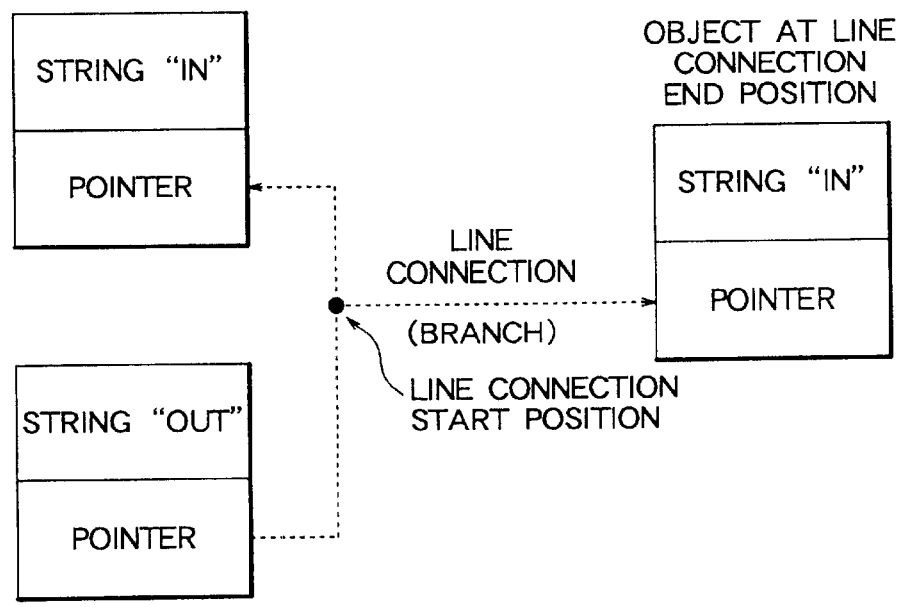

In this way, as shown in FIG. 11(a), the GUI section 20 defines a variable area 12 for the data connection line at the line connection start position and the data input terminal at the line connection end position. Subsequently, setting is effected such that a data input terminal and a data output terminal connected to the data connection line at the line connection start position and the data input terminal at the line connection end position point to the thus-defined variable area 12. As a result, as shown in FIG. 11(b), a connection between the data connection line at the line connection start position and the data input terminal at the line connection end position is established.

Figure 9:
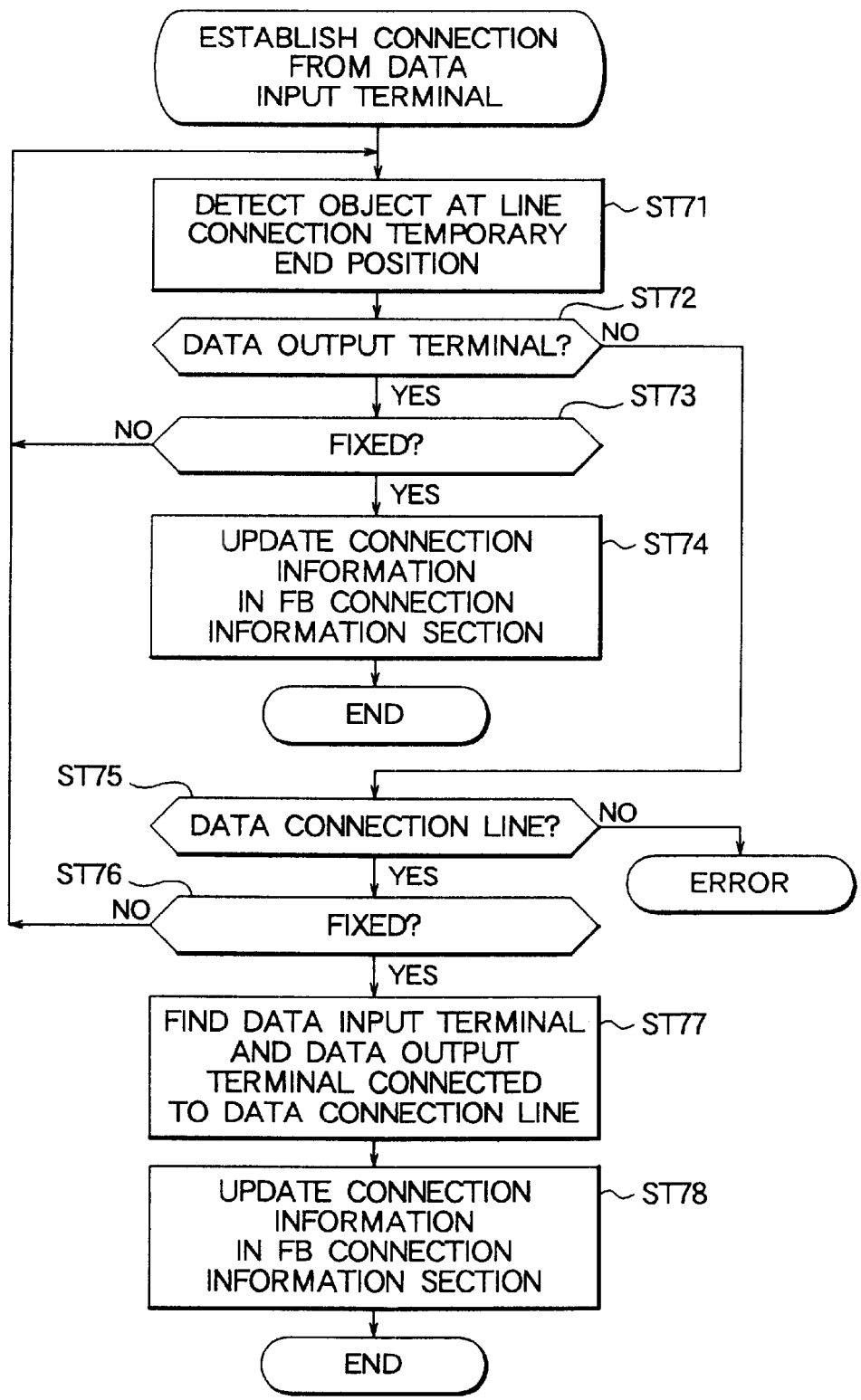

FIG. 9 shows the details of the processing for line connection from the input terminal performed step ST7 of the processing of FIG. 6. In first step ST71, the GUI section 20 detects an object at the line connection temporary end position designated by the user by use of a mouse. Then, in step ST72, a determination is made as to whether the object detected in step ST71 is a data output terminal. If the object is a data output terminal, the GUI section 20 proceeds to step ST73 in order to determine whether the data output terminal has been fixed as an object at the line connection end position. If the data output terminal is not fixed as such, the processing returns to step ST71.

When it is judged in step ST73 that the data output terminal detected in step ST71 has been fixed as an object at the line connection end position, the GUI section 20 proceeds to step ST74 so that a connection is established between the data input terminal detected in step ST1 of the processing of FIG. 6 and the data output terminal detected in step ST71. That is, a variable area 12 allocated to either of the data input terminal or the data output terminal is left valid. Then, the connection information managed by the FB connection information section 30 is updated such that the above-described pointers point to the valid variable area 12. A signal line is then displayed on the display screen such that the signal line extends between the schematic FIG. 11.

In this way, similar to the situation depicted in FIG. 10(a) (except that a data input terminal is located at the connection line start position, and a data output terminal is located at the connection line end position), the GUI section 20 defines a variable area 12 for the data input terminal at the line connection start position and the data output terminal at the line connection end position. Subsequently, setting is effected such that the data input terminal and the output terminal point the thus-defined variable area 12. As a result, as shown in FIG. 10(b), the requested connection between the data input terminal at the line connection start position and the data output terminal at the line connection end position is established.

In step ST72, if the object detected in step ST71 is not a data output terminal, the GUI section 20 proceeds to step ST75. Then, in step ST75, a determination is made as to whether the object detected in step ST71 is a data connection line. If the object is not a data connection line, the GUI section 20 determines that an error has occurred, thus terminating the processing. If the object is a data connection line, the GUI section 20 proceeds to step ST76 in order to determine whether the data connection line has been fixed as an object at the line connection end position. If the data connection line is not fixed as such, the processing returns to step ST71.

When it is judged that in step ST76 that the data connection line detected in step ST71 has been fixed as an object at the line connection end position, the GUI section 20 proceeds to step ST77. In step ST77, the data input and data output terminals connected to the thus-fixed data connection line are found. Next, in step ST88, in order to establish a connection between the data input terminal detected in step ST1 of the processing of FIG. 6 and the data connection line detected in step ST71, a variable area 12 allocated to either of the data input terminal or the data connection line is left valid. Then, the connection information managed by the FB connection information section 30 is updated such that the above-described pointers point to the valid variable area 12. A signal line is then displayed on the display screen such that the signal line extends between the schematic FIG. 11.

Figure 12A:
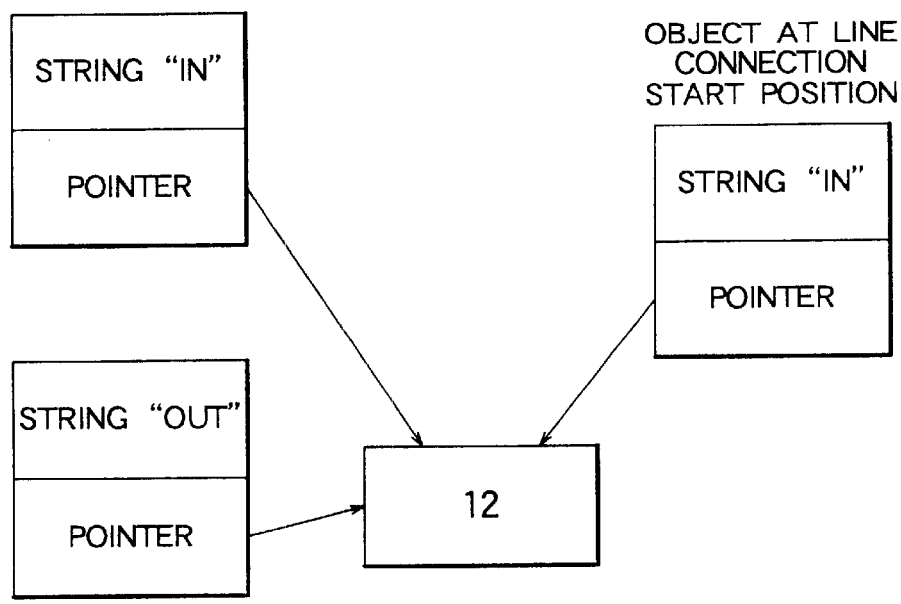
Figure 12B:
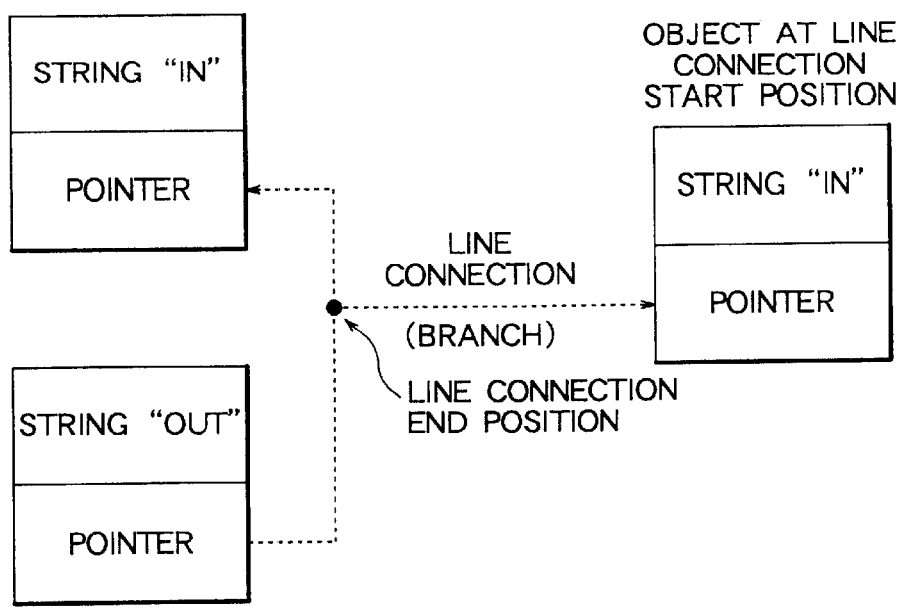

In this way, as shown in FIG. 12(a), the GUI section 20 defines a variable area 12 for the data input terminal at the line connection start position and the data connection line at the line connection end position. Subsequently, settings are effected such that the data input terminal at the line connection start position, and the data input terminal and the data output terminal connected to the data connection line detected in step ST71 point to the thus-defined variable area 12. As a result, as shown in FIG. 12(b), a connection between the data input terminal at the line connection start position and the data connection line at the line connection end position is established.

Figure 13:
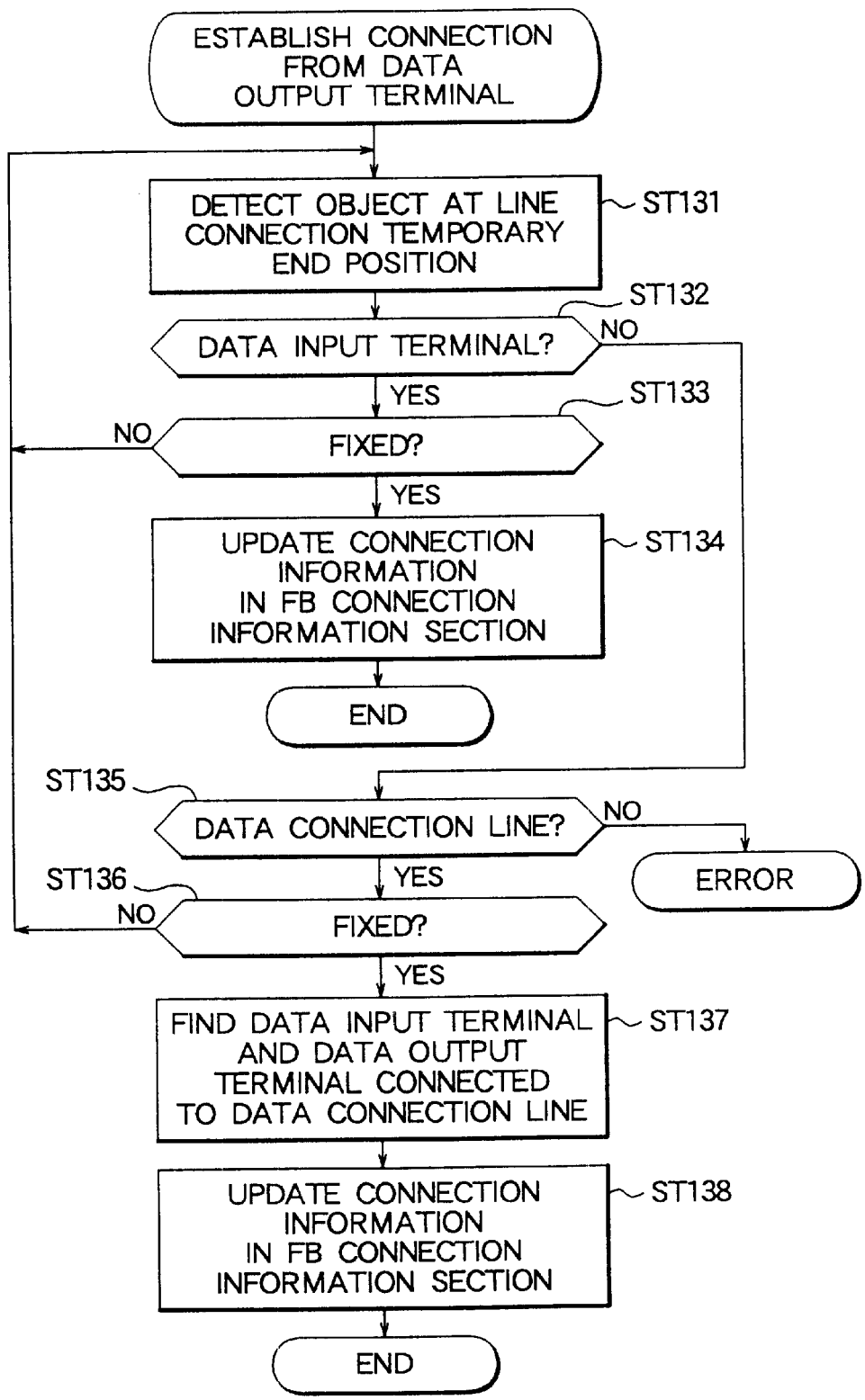
FIGS. 13 and 14 are flowcharts showing the processing performed by a GUI section according to a second embodiment.
Figure 14:
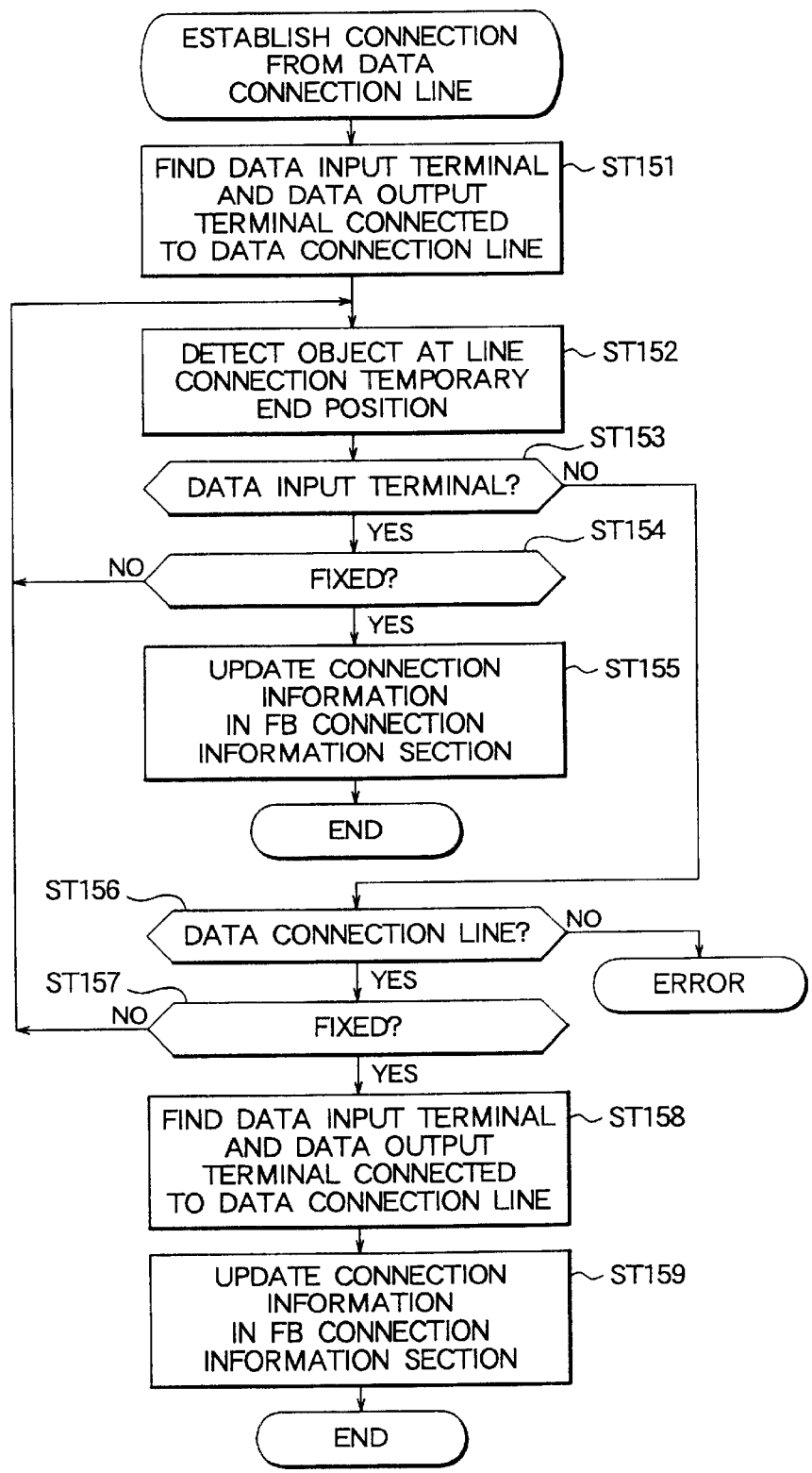

FIG. 13 is a flowchart serving as a substitute for FIG. 7, showing the flow of processing performed by the GUI section 20 according to a second embodiment. FIG. 14 is a flowchart serving as a substitute for FIG. 8, showing the flow of processing performed by the GUI section 20 according to the second embodiment.

The processing of FIG. 8 or FIG. 9 enables data to be supplied to two or more branches as shown in FIG. 11 or FIG. 12, but does not enable data merging. By contrast, the processing of FIG. 13 and the processing of FIG. 14 enable data merging.

In the case where the processing of FIG. 13 is used to execute the processing for line connection from a data output terminal in step ST3 of FIG. 6, in step ST131, the GUI section 20 detects an object located at a line connection temporary end position designated through use of a mouse.

Then, in step ST132, the GUI section 20 determines whether the object detected in step ST131 is a data input terminal. If the object is a data input terminal, the GUI section 20 proceeds to step ST133 in order to determine whether the data input terminal has been fixed as an object at the line connection end position. If the data input terminal is not fixed as such, the processing returns to step ST131.

When it is judged in step ST133 that the data input terminal detected in step ST131 has been fixed as an object at the line connection end position, the GUI section 20 proceeds to step ST134 so that a connection is established between the data output terminal detected in step ST1 of the processing of FIG. 6 and the data input terminal detected in step ST131. That is, a variable area 12 allocated to either of the data output terminal and the data input terminal is left valid. Then, the connection information managed by the FB connection information section 30 is updated such that the above-described pointers point to the valid variable area 12. A signal line is then displayed on the display screen such that the signal line extends between the schematic FIG. 11. The above-described process of step ST134 is identical with that of step ST34 of the processing of FIG. 7.

If it is determined in step ST132 that the object detected in step ST131 is not a data input terminal, the GUI section 20 proceeds to step ST135 in order to determine whether the object detected in step ST131 is a data connection line. If the object is not a data connection line, the GUI section 20 determines that an error has occurred, thus terminating the processing. If the object is a data connection line, the GUI section 20 proceeds to step ST136 in order to determine whether the data connection line has been fixed as an object at the line connection end position. If the data connection line is not fixed as such, the processing returns to step ST131.

When it is judged that in step ST136 that the data connection line detected in step ST131 has been fixed as an object at the line connection end position, the GUI section 20 proceeds to step ST137. In step ST137, the data input and data output terminals connected to the thus-fixed data connection line are found. Next, in step ST138, in order to establish a connection between the data input terminal detected in step ST1 of the processing of FIG. 6 and the data connection line detected in step ST131, a variable area 12 allocated to either of the data input terminal or the data connection line is left valid. Then, the connection information managed by the FB connection information section 30 is updated such that the above-described pointers point to the valid variable area 12. A signal line is then displayed on the display screen such that the signal line extends between the schematic FIG. 11.

Figure 15A:
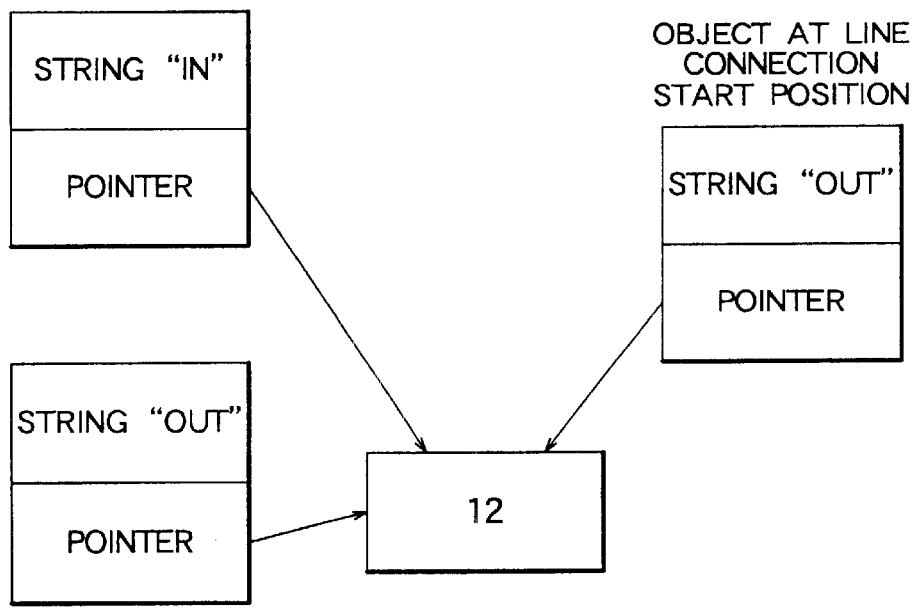
FIGS. 15 and 16 are diagrams used for describing the processing performed by the GUI section according to the second embodiment.
Figure 15B:
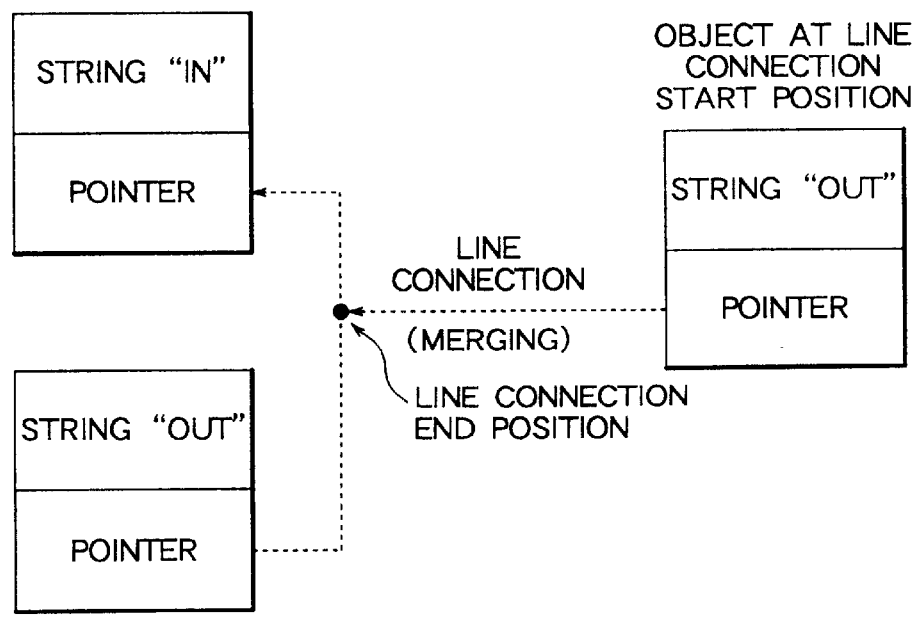

In this way, as shown in FIG. 15(a), the GUI section 20 defines a variable area 12 for the data output terminal at the line connection start position and the data connection line at the line connection end position, and effects setting such that each of the data output terminal at the line connection start position, and the data input terminal and the data output terminal connected to the data connection line at the line connection end position points to the thus-defined variable area 12. As a result, as shown in FIG. 15(b), a connection for data merging is realized between the data output terminal at the line connection start position and the data connection line at the line connection end position.

In the case where the processing of FIG. 14 is used to execute the processing for line connection from a data connection line in step ST5 of FIG. 6, in step ST151, the GUI section 20 finds a data input terminal and a data output terminal linked to the data connection line detected in step ST1 of FIG. 6.

Then, in step ST152, an object located at a line connection temporary end position designated through use of a mouse is detected. Next, in step ST153, the GUI section 20 determines whether the object detected in step ST152 is a data input terminal. If the object is a data input terminal, the GUI section 20 proceeds to step ST154 in order to determine whether the data input terminal has been fixed as an object at the line connection end position. If the data input terminal is not fixed as such, the processing returns to step ST152.

When it is judged in step ST154 that the data input terminal detected in step ST152 has been fixed as an object at the line connection end position, the GUI section 20 proceeds to step ST155. In step ST155, the GUI section 20 establishes a connection between the data connection line detected in step ST1 of the processing of FIG. 6 and the data input terminal detected in step ST152. That is, a variable area 12 allocated to either of the data connection line and the data input terminal is left valid. Then, the connection information managed by the FB connection information section 30 is updated such that the above-described pointers point to the valid variable area 12. A signal line is then displayed on the display screen such that the connection line extends between the schematic FIG. 11. The above-described process of step ST155 is identical with that of step ST55 of the processing of FIG. 8.

If it is determined in step ST153 that the object detected in step ST152 is not a data input terminal, the GUI section 20 proceeds to step ST156 in order to determine whether the object detected in step ST151 is a data connection line. If the object is not a data connection line, the GUI section 20 determines that an error has occurred, thus terminating the processing. If the object is a data connection line, the GUI section 20 proceeds to step ST157 in order to determine whether the data connection line has been fixed as an object at the line connection end position. If the data connection line is not fixed as such, the processing returns to step ST152.

When it is judged in step ST157 that the data connection line detected in step ST152 has been fixed as an object at the line connection end position, the GUI section 20 proceeds to step ST158. In step ST158, data input and data output terminals connected to the thus-fixed data connection line are found. Next, in step ST159, in order to establish a connection between the data connection line detected in step ST1 of the processing of FIG. 6 and the data connection line detected in step ST152, a variable area 12 allocated to either of the data connection lines is left valid. Then, the connection information managed by the FB connection information section 30 is updated such that the above-described pointers point to the valid variable area 12. A signal line is then displayed on the display screen such that the signal line extends between the schematic FIG. 11.

Figure 16A:
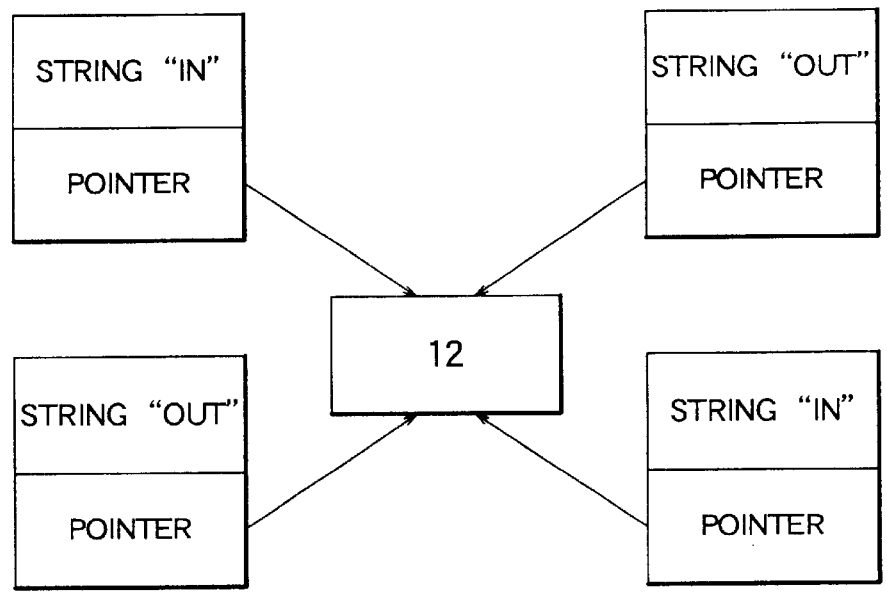
Figure 16B:
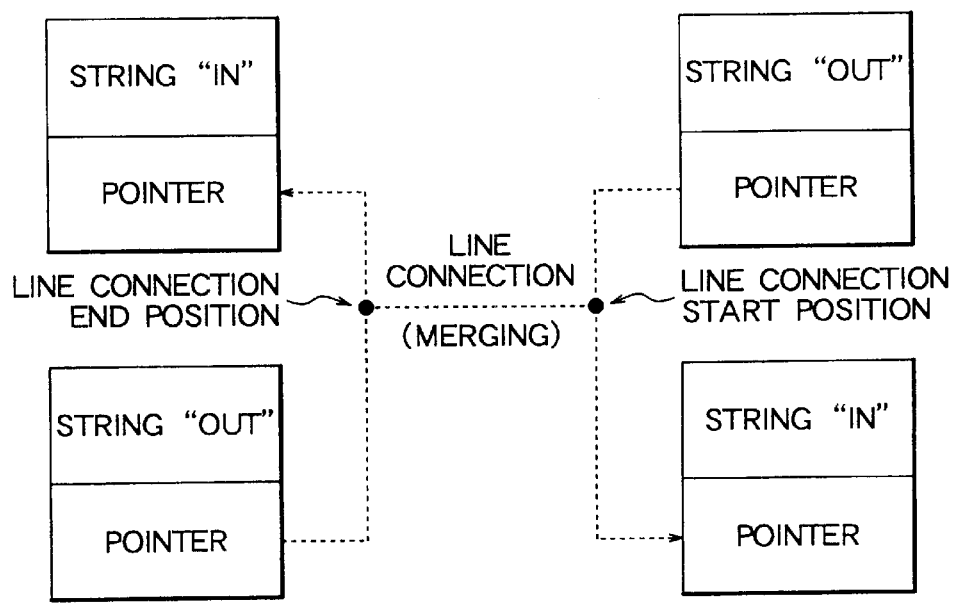

In this way, as shown in FIG. 16(a), the GUI section 20 defines a variable area 12 for the data connection line which is detected in step ST1 of FIG. 6 and which is located at the line connection start position and the data connection line which is detected in step ST152 and which is located at the line connection end position. Subsequently, settings are effected such that the data input and data output terminals connected to the data connection line detected in step ST1 of FIG. 6, and the data input terminal and the data output terminal connected to the data connection line detected in step ST152 point to the thus-defined variable area 12. As a result, as shown in FIG. 16(b), a connection for data merging is realized between the data connection line at the line connection start position and the data connection line at the line connection end position.

Although not described in the above-described processing, the GUI section 20 has a function for rejecting a request for establishing a connection between an event terminal and a data input terminal, a request for establishing a connection between an event terminal and a data output terminal, a request for establishing a connection between data input and output terminals that are of different data types, and a request for establishing a connection between terminals that have already been connected. The GUI section 20 has another function such that when the processing is ended due to an error, the GUI section 20 performs proper processing corresponding to the error, such as processing of providing a display that informs the user of a reason why a connection cannot be established.

Figure 17:
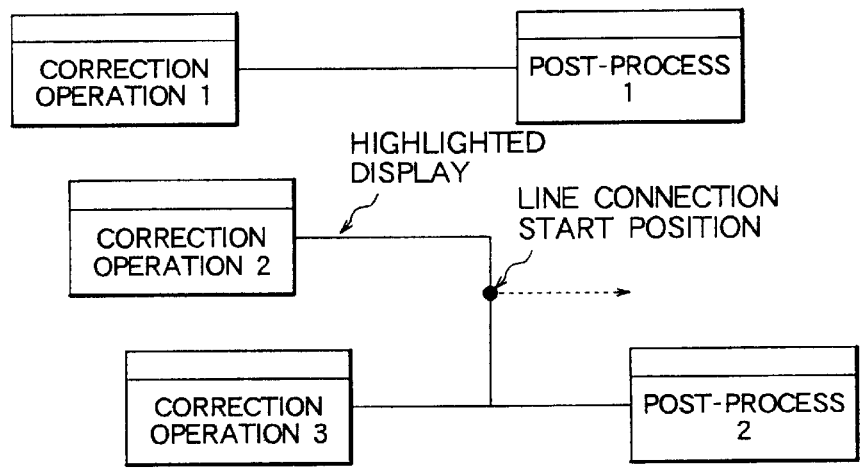
FIG. 17 is an explanatory view showing a highlighted display of a connection line.

Moreover, the GUI section 20 has the following function. When a data connection line is selected as a line connection start position, as shown in FIG. 17, the GUI section 20 highlights data connection lines that have already been connected to the selected data connection line, to thereby clearly show the terminals of event-driven-type function blocks that have already been connected to the selected data connection line.

The highlighted display may be applied to an event connection line between adjacent function blocks for convenience of the user. However, an event that branches off to a different function block on the upstream side with respect to a connection position does not affect function blocks on the downstream side with respect to the connection position. Therefore, the highlighted display may be performed such that a portion of the event line that transfers the ineffective event is not highlighted.

As has been described, in the function block processing apparatus 1 of the present invention, when a signal line is set in order to establish a connection between data processing blocks of event-driven function blocks, a variable area 12 for data transfer is set for the thus-set connection; and a pointer for pointing to the variable area 12 is allocated for each of the event-driven function blocks so that each of the data processing blocks inputs data from and outputs data to the variable area 12.

In the function block processing apparatus of the present invention having the above-described configuration, data output from the data-output-side event-driven function blocks are immediately written into the variable area 12, and when an event is transferred the data-input-side event-driven function block providing a data input function can read data from the variable area 12 as is. Therefore, no confusion arises in relation to data sources from which data are read, and thus a connection for data merging is realized.

When programming is performed through use of event-driven-type function blocks, a data merging operation can be realized through a simple operation of establishing data connection lines. Therefore, it becomes possible to eliminate an event-driven function block having a selection function, to thereby greatly reduced memory capacity. The reduction in memory capacity is also attributed to the fact that the variable area 12 is not required to be provided for each of the data input/output terminals of event-driven function blocks.

Conventionally, during execution of the application function, a copy operation must be performed in order to transfer data between variable areas set for the terminals of the event-driven function blocks. By contrast, in the present invention, data output from a data-output-side event-driven function block are immediately written into the variable area 12 from which data are directly read by a data-input-side event-driven function block. Thus, the above-described copy operation becomes unnecessary, and the application function can be executed at higher speed.

When a configuration that enables data merging is employed, a data set stored in the variable area 12 correspond to a newest one among data sets output from a plurality of event-driven function blocks to be merged.

For this reason, the GUI section 20 has a function of identifying an event-driven function block that has written data into the variable area 12 during execution of the application function by the FB execution section 40.

Figure 18:
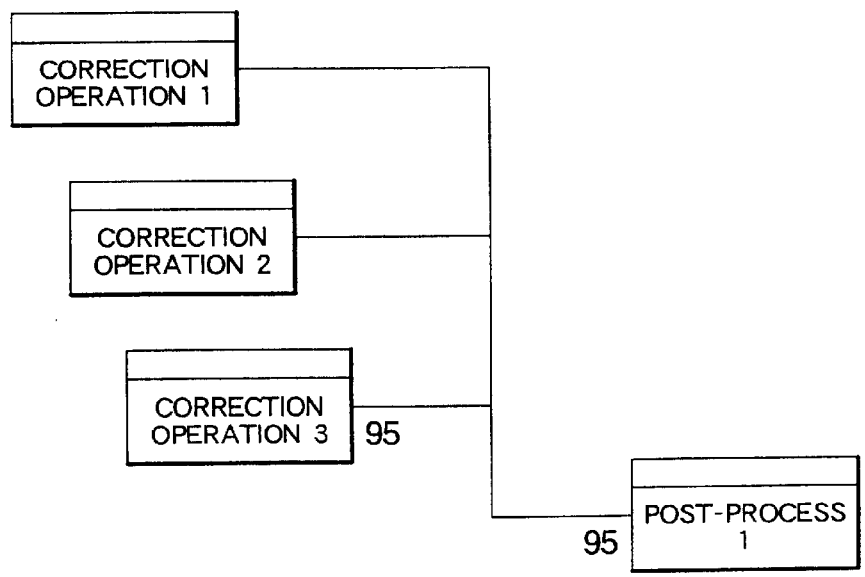
FIG. 18 is a diagram showing the processing for identifying a source of data written into the variable area.
Figure 19:
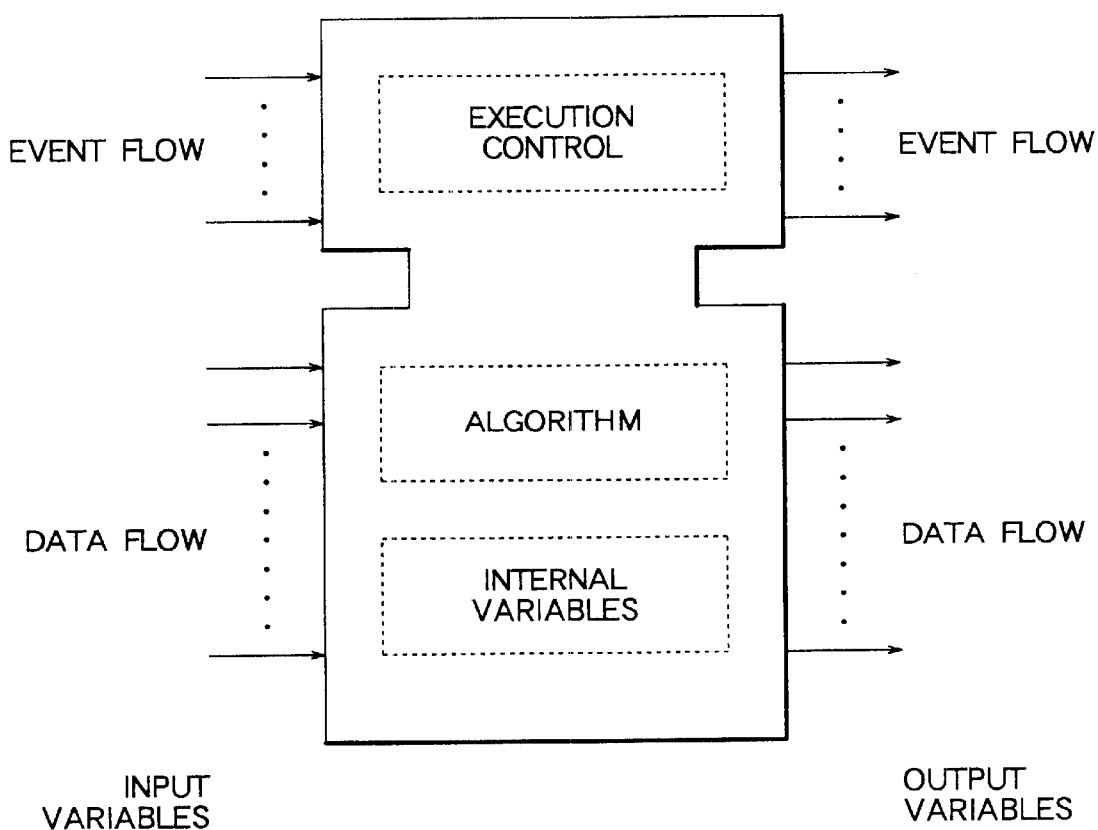
FIG. 19 is an explanatory diagram of an event-driven-type function block.
Figure 20:
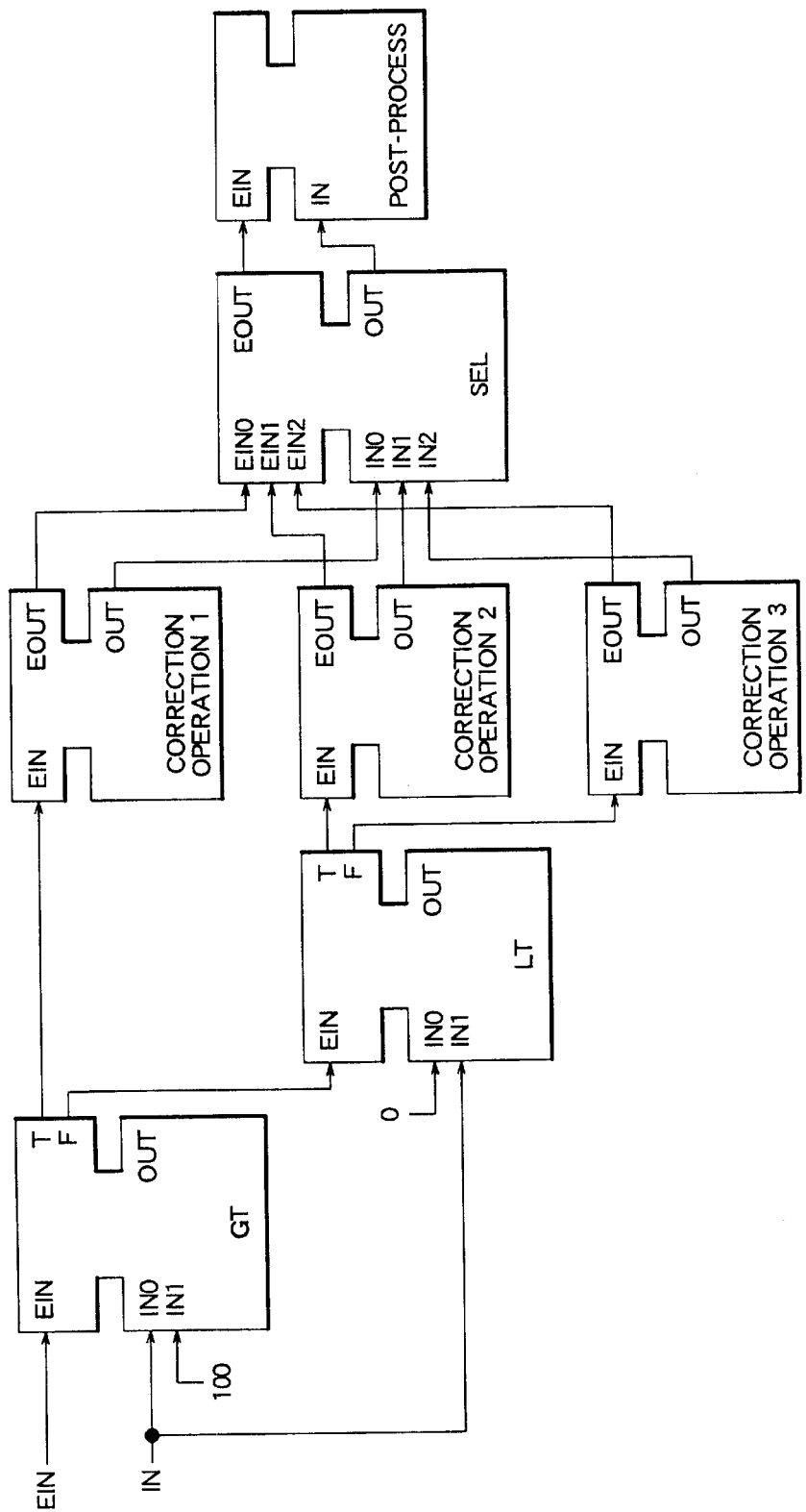
FIG. 20 is an explanatory diagram used for describing an application program function.
Figure 21:
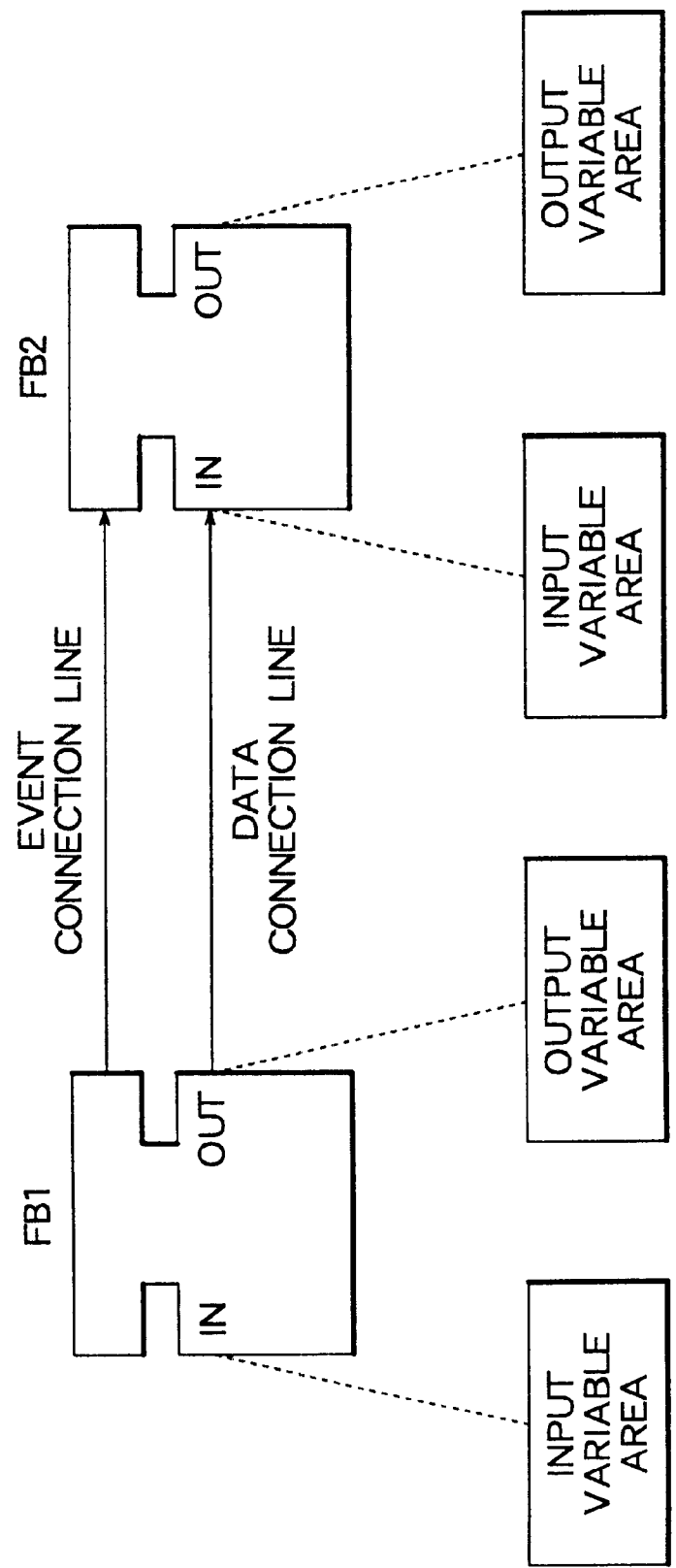
FIGS. 21–23 are diagrams showing background art.
Figure 22:
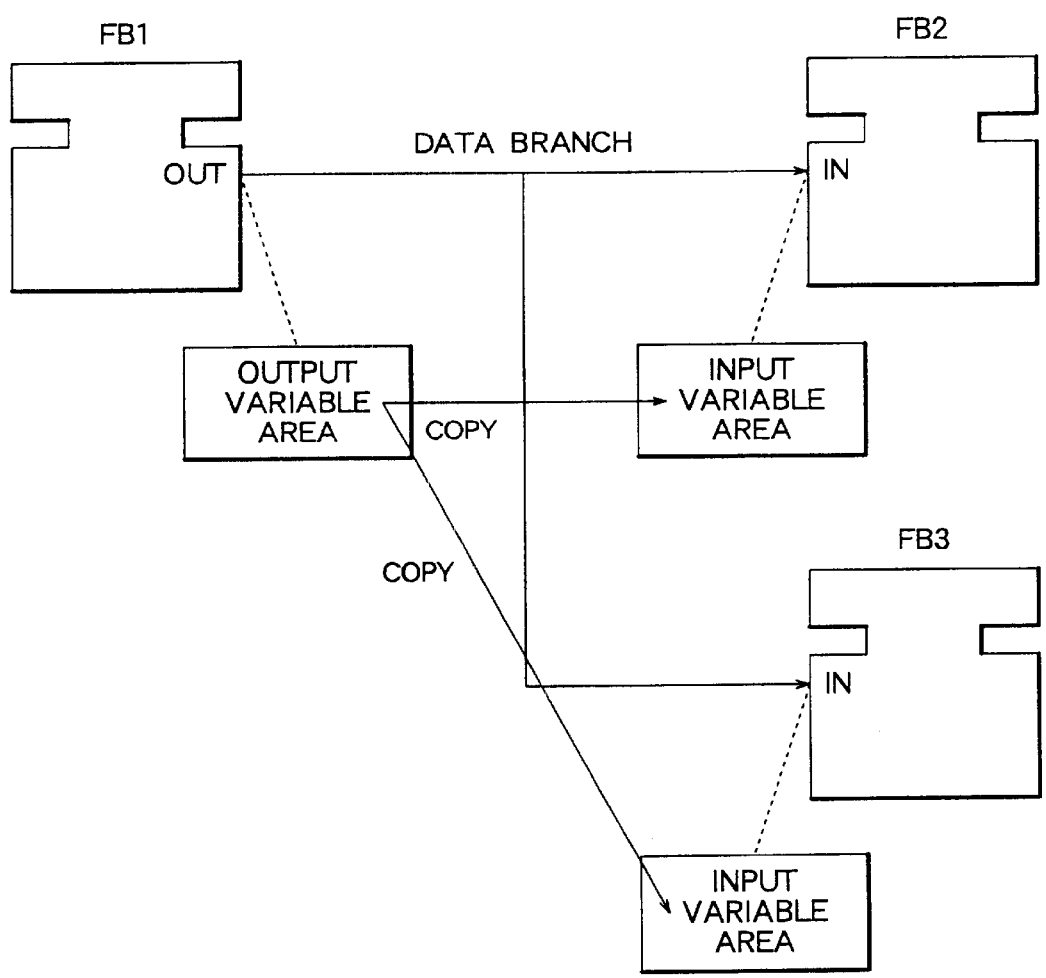
Figure 23:
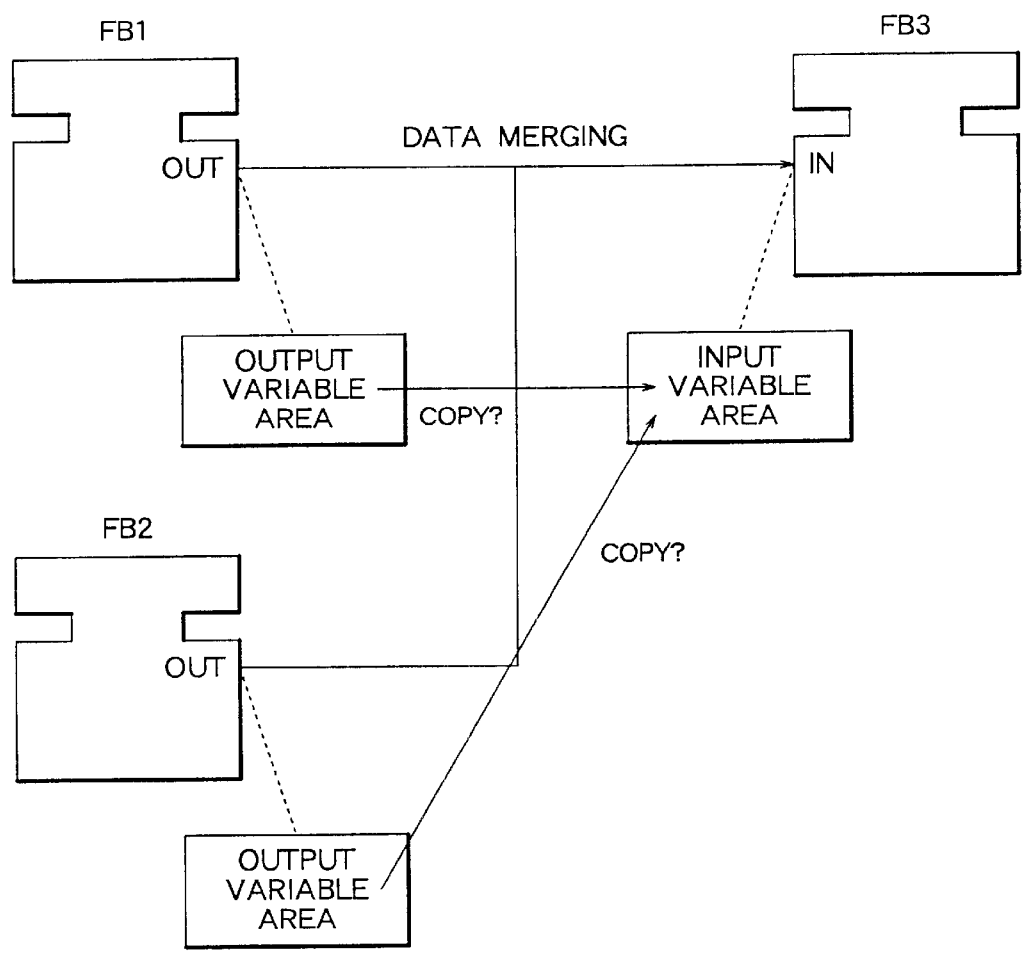

For example, as shown in FIG. 18, the value of data written into the variable area 12 is displayed adjacent to an event-driven function block which has output the data, and is also displayed adjacent to an event-driven block which reads the data. As a result, the user can easily identify the event-driven function block that has written data into the variable area 12.

The data set written into the variable area 12 is the newest one among data sets output from the data-output-side event-driven function blocks, and the data set previously written in the variable area 12 has been erased through overwriting of the newest data set.

In the case where the above-described configuration cannot be used because of a certain problem, a variable area 12 of a first-in-first-out (FIFO) type must be employed. Such variable area 12 enables an operation such that a data set that is first output and subsequent output data sets are stored successively into the variable area 12, and data sets are read out in the same order, from the first data set, every time the data-input-side event-driven function block issues a data read request. Thus, the problem involved in overwriting erasure can be solved.

In the above-described embodiments of the present invention, one variable area 12 is set for a connection between the data processing blocks of event-driven function blocks and allocates a pointer for pointing to the variable area 12 to each data processing block so that each of the data processing blocks inputs data from or outputs data to the variable area 12. However, there may be employed a method in which, in response to a user's request, the configuration according to the present invention and the conventional configuration—in which a variable area is set for each of terminals of event-driven function blocks—may be selectively used in a mixed manner, which selection is made between the two configurations for each of various portions of an application function.

As has been described, according to the present invention, a connection that enables data merging can be established among event-driven function blocks, so that an application function defined by connections established between the event-driven function blocks can be programmed efficiently.

In addition, since direct connections can be established among event-driven function blocks without use of an event-driven function block having a selection function, memory capacity can be reduced, Moreover, an application function can be executed at higher speed, because a copy operation for transferring data between event-driven function blocks is not required to be performed during execution of the application.

What is claimed is:

1. A method for programming an application function through connection of a plurality of event-driven-type function blocks each composed of a data processing block and an event processing block, the method comprising at least first and second processing steps, wherein
when a first data signal line is set in order to establish a connection between first and second event-driven-type function blocks, the first processing step is performed in order to set a first variable area corresponding to the established connection and adapted for data transfer; and
a second processing step for allocating a pointer for pointing to the first variable area to each of the first and second event-driven-type function blocks so that the first and second event-driven-type function blocks output data to and input data from the first variable area.

2. A programming method according to claim 1, wherein in the first processing step, the first variable area for data transfer corresponding to the data signal line is set through selection of one of a plurality of variable areas generated when the first and second event-driven-type function blocks are generated.

3. A programming method according to claim 1, wherein in the first processing step, an FIFO-type variable area is set as the first variable area.

4. A programming method according to claim 1, wherein the first processing step comprises:
a processing step for setting a second data signal line to establish connection between a third event-driven-type function block and the first data signal line mutually connecting the first and second event-driven-type function blocks; and
a processing step for setting a second variable area corresponding to the established connection and adapted for data transfer.

5. A programming method according to claim 4, wherein the second variable area for data transfer corresponding to the second data signal line is set through selection of either the first variable area set in response to the setting of the first data signal line or one of a plurality of variable areas generated when the third event-driven-type function block is generated.

6. A programming method according to claim 4, wherein in the first processing step, an FIFO-type variable area is set as the second variable area.

7. A programming method according to claim 1, wherein the first processing step comprises:
- a processing step for setting a third data signal line to establish connection between third and fourth event-driven-type function blocks;
- a processing step for setting a fourth data signal line in order to establish a connection between the first data signal line mutually connecting the first and second event-driven-type function blocks and the third data signal line mutually connecting the third and fourth event-driven-type function blocks; and
- a processing step for setting a third variable area corresponding to the established connection and adapted for data transfer.

8. A programming method according to claim 7, wherein
- in response to the setting of the third data signal line mutually connecting the third and fourth event-driven-type function blocks, a fourth variable area for data transfer is set for the established connection; and
- the third variable area for data transfer corresponding to the fourth data signal line is set through selection of either the first variable area set for the first data signal line mutually connecting the first and second event-driven-type function blocks or the fourth variable area set for the third data signal line mutually connecting the third and fourth event-driven-type function blocks.

9. A programming method according to claim 7, wherein in the first processing step, an FIFO-type variable area is set as the third variable area.

10. A program recording medium in which is stored a program for executing a method for programming an application function through connection of a plurality of event-driven-type function blocks each composed of a data processing block and an event processing block, the program recording medium stores a program for causing a computer to perform a setting process and an allocation process, wherein
- when a data signal line is set in order to establish a connection between first and second event-driven-type function blocks, the setting process sets a first variable area corresponding to the established connection and adapted for data transfer; and
- the allocation process allocates a pointer for pointing the first variable area to each of the first and second event-driven-type function blocks so that the first and second event-driven-type function blocks output data to and input data from the first variable area.

11. An apparatus for programming an application function through connection of a plurality of event-driven-type function blocks each composed of a data processing block and an event processing block, the apparatus comprising at least a setting section and an allocation section, wherein
- when a first data signal line is set in order to establish a connection between first and second event-driven-type function blocks, the setting section sets a first variable area corresponding to the established connection and adapted for data transfer; and
- the allocation section allocates a pointer for pointing the first variable area to each of the first and second event-driven-type function blocks so that the first and second event-driven-type function blocks output data to and input data from the first variable area.

12. A programming apparatus according to claim 11, wherein the setting section sets an FIFO-type variable area as the first variable area.

13. A programming apparatus according to claim 11, wherein when a second data signal line is set to establish a connection between a third event-driven-type function block and the first data signal line mutually connecting the first and second event-driven-type function blocks, the setting section sets a second variable area corresponding to the established connection and adapted for data transfer.

14. A programming apparatus according to claim 13, wherein the setting section sets an FIFO-type variable area as the second variable area.

15. A programming apparatus according to claim 11, wherein when a fourth data signal line is set to establish a connection between the first data signal line mutually connecting the first and second event-driven-type function blocks and a third data signal line mutually connecting third and fourth event-driven-type function blocks, the setting section sets a third variable area corresponding to the established connection and adapted for data transfer.

16. A programming apparatus according to claim 15, wherein the setting section sets an FIFO-type variable area as the third variable area.

17. A computer-readable recording medium in which is stored an application function programmed through connection of a plurality of event-driven-type function blocks each composed of a data processing block and an event processing block, wherein the application function performs:
- data transfer between first and second event-driven-type function blocks by use of a first variable area provided for a first signal line set between the first and second event-driven-type function blocks;
- data transfer between a third event-driven-type function block and the first data signal line mutually connecting the first and second event-driven-type function blocks by use of a second variable area provided for a second signal line set between the third event-driven-type function block and the first data signal line mutually connecting the first and second event-driven-type function blocks; and
- data transfer between the first data signal line mutually connecting the first and second event-driven-type function blocks and a fourth data signal line mutually connecting fourth and fifth event-driven-type function blocks by use of a third variable area provided for the fourth data signal line set between the first signal line mutually connecting the first and second event-driven-type function blocks and the third signal line mutually connecting the fourth and fifth event-driven-type function blocks.

* * * * *